United States Patent
Fujimoto et al.

(10) Patent No.: US 9,749,496 B2
(45) Date of Patent: Aug. 29, 2017

(54) PERFORMING HALFTONE PROCESSING USING INTRA-CELL SUM VALUE DIFFERENCES APPLIED SO AS TO CORRECT BOUNDARY PIXELS

(71) Applicant: CANON KABUSHIKI KAISHA, Tokyo (JP)

(72) Inventors: Akihiro Fujimoto, Yokohama (JP); Hisashi Ishikawa, Urayasu (JP); Yuji Hara, Machida (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 14/297,026

(22) Filed: Jun. 5, 2014

(65) Prior Publication Data
US 2014/0376056 A1 Dec. 25, 2014

(30) Foreign Application Priority Data

Jun. 19, 2013 (JP) .................................. 2013-129028
Nov. 25, 2013 (JP) .................................. 2013-242889

(51) Int. Cl.
*H04N 1/405* (2006.01)
(52) U.S. Cl.
CPC .................................. *H04N 1/405* (2013.01)
(58) Field of Classification Search
None
See application file for complete search history.

(56) References Cited

U.S. PATENT DOCUMENTS

| 2009/0097776 A1* | 4/2009 | Fukamachi | H04N 1/405 382/269 |
| 2009/0219578 A1* | 9/2009 | Lee | H04N 1/409 358/3.06 |
| 2011/0157265 A1* | 6/2011 | Itogawa | B41J 2/2114 347/9 |
| 2012/0026554 A1* | 2/2012 | Genda | G06K 15/1822 358/3.27 |

FOREIGN PATENT DOCUMENTS

| JP | H05-328121 A | 12/1993 |
| JP | 2005-252583 A | 9/2005 |
| JP | 2010-074627 A | 4/2010 |
| JP | 2010-245591 A | 10/2010 |
| JP | 2012-183763 A | 9/2012 |
| JP | 2013-034183 A | 2/2013 |
| JP | 2013-172284 A | 9/2013 |

OTHER PUBLICATIONS

Office Action for corresponding Japanese Application No. 2013-129028 dated Feb. 24, 2017.
Japanese Office Action dated Jul. 4, 2017 in corresponding Japanese Patent Application No. 2013-242889 together with English translation, 9 pages.

* cited by examiner

*Primary Examiner* — Christopher D Wait
(74) *Attorney, Agent, or Firm* — Carter, DeLuca, Farrell & Schmidt, LLP

(57) ABSTRACT

Screen processing is performed on input image data. A boundary pixel adjacent to a white pixel in the input image data is detected. Output image data based on either the input image data or the screen-processed image data is selectively output for each pixel in accordance with the detection result of the boundary pixel.

17 Claims, 24 Drawing Sheets

INPUT IMAGE DATA

| | | | | | | | | | | | | | | | |
|---|---|---|---|---|---|---|---|---|---|---|---|---|---|---|---|
| 96 | 96 | 96 | 96 | 96 | 96 | 96 | 96 | 96 | 96 | 96 | 96 | 96 | 96 | 96 | 96 |
| 96 | 96 | 96 | 96 | 96 | 96 | 96 | 96 | 96 | 96 | 96 | 96 | 96 | 96 | 96 | 96 |
| 96 | 96 | 96 | 96 | 96 | 96 | 96 | 96 | 96 | 96 | 96 | 96 | 96 | 96 | 96 | 96 |
| 0 | 96 | 96 | 96 | 96 | 96 | 96 | 96 | 96 | 96 | 96 | 96 | 96 | 96 | 96 | 96 |
| 0 | 0 | 96 | 96 | 96 | 96 | 96 | 96 | 96 | 96 | 96 | 96 | 96 | 96 | 96 | 96 |
| 0 | 0 | 0 | 96 | 96 | 96 | 96 | 96 | 96 | 96 | 96 | 96 | 96 | 96 | 96 | 96 |
| 0 | 0 | 0 | 0 | 96 | 96 | 96 | 96 | 96 | 96 | 96 | 96 | 96 | 96 | 96 | 96 |
| 0 | 0 | 0 | 0 | 0 | 96 | 96 | 96 | 96 | 96 | 96 | 96 | 96 | 96 | 96 | 96 |
| 0 | 0 | 0 | 0 | 0 | 0 | 96 | 96 | 96 | 96 | 96 | 96 | 96 | 96 | 96 | 96 |
| 0 | 0 | 0 | 0 | 0 | 0 | 0 | 96 | 96 | 96 | 96 | 96 | 96 | 96 | 96 | 96 |
| 0 | 0 | 0 | 0 | 0 | 0 | 0 | 0 | 96 | 96 | 96 | 96 | 96 | 96 | 96 | 96 |
| 0 | 0 | 0 | 0 | 0 | 0 | 0 | 0 | 0 | 96 | 96 | 96 | 96 | 96 | 96 | 96 |
| 0 | 0 | 0 | 0 | 0 | 0 | 0 | 0 | 0 | 0 | 96 | 96 | 96 | 96 | 96 | 96 |
| 0 | 0 | 0 | 0 | 0 | 0 | 0 | 0 | 0 | 0 | 0 | 96 | 96 | 96 | 96 | 96 |
| 0 | 0 | 0 | 0 | 0 | 0 | 0 | 0 | 0 | 0 | 0 | 0 | 96 | 96 | 96 | 96 |
| 0 | 0 | 0 | 0 | 0 | 0 | 0 | 0 | 0 | 0 | 0 | 0 | 0 | 96 | 96 | 96 |

F I G. 5B

IMAGE DATA HAVING UNDERGONE SCREEN PROCESSING

BOUNDARY-REPLACEMENT IMAGE DATA

| 0 | 0 | 0 | 0 | 0 | 0 | 0 | 0 | 0 | 0 | 0 | 0 | 0 | 96 | 255 | 0 |
| --- | --- | --- | --- | --- | --- | --- | --- | --- | --- | --- | --- | --- | --- | --- | --- |
| 0 | 0 | 0 | 0 | 0 | 0 | 0 | 0 | 0 | 0 | 0 | 0 | 96 | 0 | 0 | 0 |
| 0 | 0 | 0 | 0 | 0 | 0 | 0 | 0 | 0 | 0 | 0 | 96 | 0 | 0 | 0 | 0 |
| 0 | 0 | 0 | 0 | 0 | 0 | 0 | 0 | 0 | 96 | 255 | 0 | 0 | 0 | 0 | 0 |
| 0 | 0 | 0 | 0 | 0 | 0 | 0 | 0 | 96 | 255 | 0 | 0 | 0 | 0 | 0 | 0 |
| 0 | 0 | 0 | 0 | 0 | 0 | 0 | 96 | 0 | 0 | 0 | 255 | 255 | 255 | 255 | 0 |
| 0 | 0 | 0 | 0 | 0 | 0 | 96 | 0 | 0 | 0 | 0 | 255 | 0 | 0 | 255 | 0 |
| 0 | 0 | 0 | 0 | 0 | 96 | 255 | 0 | 0 | 0 | 0 | 0 | 0 | 255 | 255 | 0 |
| 0 | 0 | 0 | 0 | 96 | 255 | 0 | 0 | 0 | 255 | 255 | 0 | 0 | 0 | 0 | 0 |
| 0 | 0 | 0 | 96 | 0 | 0 | 0 | 0 | 255 | 255 | 255 | 255 | 0 | 0 | 0 | 0 |
| 0 | 0 | 0 | 96 | 0 | 0 | 0 | 0 | 255 | 255 | 0 | 0 | 0 | 255 | 255 | 0 |
| 0 | 0 | 96 | 0 | 0 | 0 | 0 | 0 | 0 | 255 | 255 | 0 | 0 | 255 | 255 | 0 |
| 0 | 96 | 0 | 0 | 0 | 0 | 255 | 255 | 255 | 255 | 0 | 0 | 0 | 255 | 255 | 255 |
| 96 | 0 | 0 | 0 | 0 | 255 | 255 | 255 | 255 | 0 | 0 | 0 | 255 | 255 | 255 | 255 |
| 255 | 0 | 0 | 0 | 0 | 255 | 255 | 255 | 255 | 0 | 0 | 0 | 255 | 255 | 255 | 255 |
| 0 | 0 | 0 | 0 | 0 | 0 | 255 | 255 | 0 | 0 | 0 | 0 | 0 | 255 | 255 | 0 |

FIG. 5E

CORRECTED IMAGE DATA (BEFORE QUANTIZATION)

| 0 | 0 | 0 | 0 | 0 | 0 | 0 | 0 | 0 | 128 | 255 |
|---|---|---|---|---|---|---|---|---|---|---|
| 0 | 0 | 0 | 0 | 0 | 0 | 0 | 0 | 128 | 255 | 32 |
| 0 | 0 | 0 | 0 | 0 | 0 | 0 | 128 | 32 | 32 | 32 |
| 0 | 0 | 0 | 0 | 0 | 0 | 128 | 32 | 32 | 32 | 32 |
| 0 | 0 | 0 | 0 | 0 | 128 | 255 | 255 | 32 | 0 | 0 |
| 0 | 0 | 0 | 0 | 128 | 255 | 32 | 32 | 32 | 0 | 0 |
| 0 | 0 | 0 | 128 | 255 | 32 | 32 | 0 | 255 | 255 | 0 |
| 0 | 0 | 128 | 32 | 32 | 32 | 32 | 255 | 255 | 255 | 255 |
| 0 | 128 | 255 | 32 | 32 | 0 | 0 | 255 | 255 | 255 | 255 |
| 128 | 255 | 32 | 32 | 32 | 0 | 0 | 0 | 255 | 255 | 0 |
| 32 | 32 | 32 | 0 | 255 | 255 | 0 | 0 | 0 | 0 | 0 |

FIG. 5F

CORRECTED IMAGE DATA (AFTER QUANTIZATION)

| 0 | 0 | 0 | 0 | 0 | 0 | 0 | 0 | 0 | 136 | 255 |
|---|---|---|---|---|---|---|---|---|---|---|
| 0 | 0 | 0 | 0 | 0 | 0 | 0 | 0 | 136 | 255 | 34 |
| 0 | 0 | 0 | 0 | 0 | 0 | 0 | 136 | 34 | 34 | 34 |
| 0 | 0 | 0 | 0 | 0 | 0 | 136 | 34 | 34 | 34 | 34 |
| 0 | 0 | 0 | 0 | 0 | 136 | 255 | 255 | 34 | 0 | 0 |
| 0 | 0 | 0 | 0 | 136 | 255 | 34 | 34 | 34 | 0 | 0 |
| 0 | 0 | 0 | 136 | 255 | 34 | 34 | 0 | 255 | 255 | 0 |
| 0 | 0 | 136 | 34 | 34 | 34 | 34 | 255 | 255 | 255 | 255 |
| 0 | 136 | 255 | 34 | 34 | 0 | 0 | 255 | 255 | 255 | 255 |
| 136 | 255 | 34 | 34 | 34 | 0 | 0 | 0 | 255 | 255 | 0 |
| 34 | 34 | 34 | 0 | 255 | 255 | 0 | 0 | 0 | 0 | 0 |

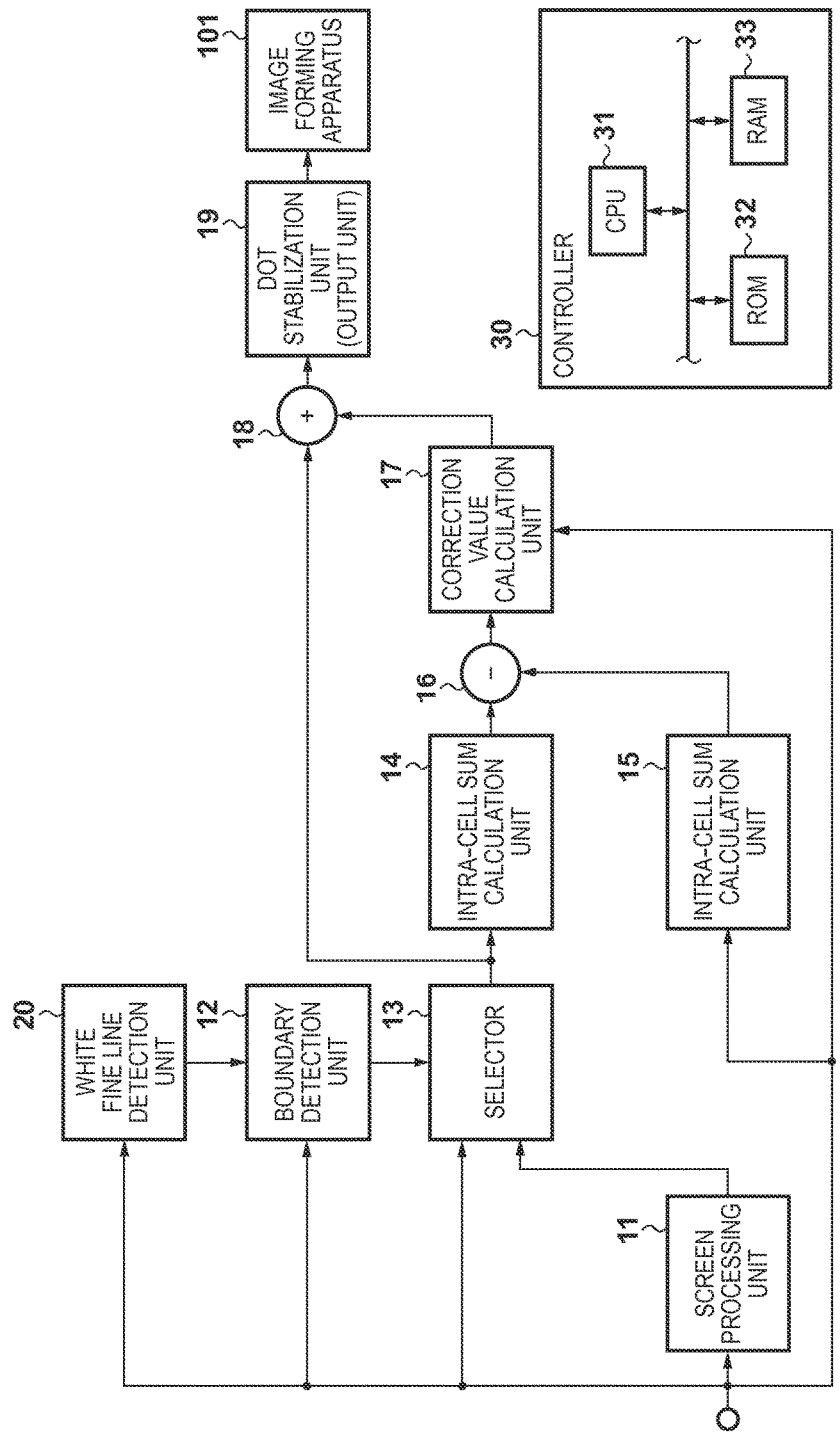

FIG. 7

| A | B | C |
|---|---|---|
| D | * | E |
| F | G | H |

FIG. 8A
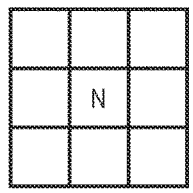
N : HALFTONE PIXEL
W : WHITE PIXEL (VALUE = 0) EXCEPT FOR WHITE FINE LINE
NW : PIXEL FORMING WHITE FINE LINE
B : BLACK PIXEL HAVING VALUE OF 255
FIG. 8B  FIG. 8C  FIG. 8D  FIG. 8E
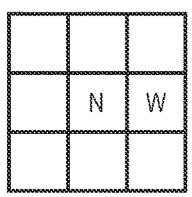 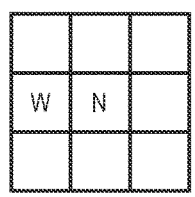 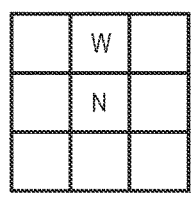 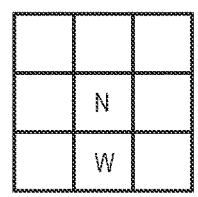
FIG. 8F  FIG. 8G  FIG. 8H  FIG. 8I
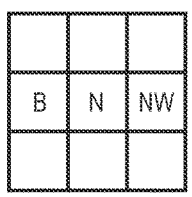 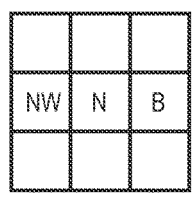 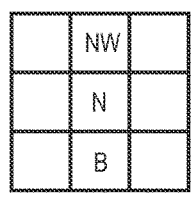 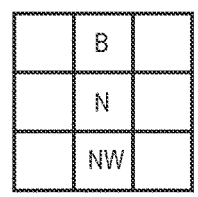
FIG. 8J  FIG. 8K  FIG. 8L  FIG. 8M
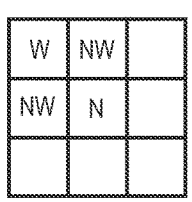 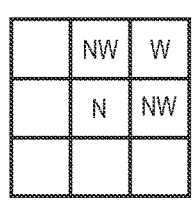 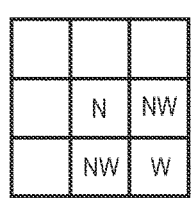 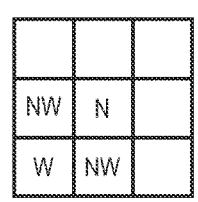

F I G. 9A

INPUT IMAGE DATA

| 0 | 0 | 0 | 0 | 0 | 0 | 0 | 0 | 0 | 0 | 0 | 0 | 128 | 128 | 128 |
|---|---|---|---|---|---|---|---|---|---|---|---|---|---|---|
| 0 | 0 | 0 | 0 | 0 | 0 | 0 | 0 | 0 | 0 | 0 | 0 | 128 | 128 | 128 |
| 0 | 0 | 0 | 0 | 0 | 0 | 0 | 0 | 0 | 0 | 0 | 128 | 128 | 128 | 128 |
| 0 | 0 | 0 | 0 | 0 | 0 | 0 | 0 | 0 | 0 | 128 | 128 | 128 | 128 | 128 |
| 0 | 0 | 0 | 0 | 0 | 0 | 0 | 0 | 0 | 128 | 128 | 128 | 128 | 128 | 128 |
| 0 | 0 | 0 | 0 | 0 | 0 | 0 | 0 | 128 | 128 | 128 | 128 | 128 | 128 | 128 |
| 0 | 0 | 0 | 0 | 0 | 0 | 0 | 128 | 128 | 128 | 128 | 128 | 128 | 128 | 128 |
| 0 | 0 | 0 | 0 | 0 | 0 | 128 | 128 | 128 | 128 | 128 | 128 | 128 | 128 | 128 |
| 0 | 0 | 0 | 0 | 0 | 128 | 128 | 128 | 128 | 128 | 128 | 128 | 128 | 128 | 128 |
| 0 | 0 | 0 | 0 | 128 | 128 | 128 | 128 | 128 | 128 | 128 | 128 | 128 | 128 | 128 |
| 0 | 0 | 0 | 128 | 128 | 128 | 128 | 128 | 128 | 128 | 128 | 128 | 128 | 128 | 128 |
| 0 | 0 | 128 | 128 | 128 | 128 | 128 | 128 | 128 | 128 | 128 | 128 | 128 | 128 | 128 |
| 0 | 128 | 128 | 128 | 128 | 128 | 128 | 128 | 128 | 128 | 128 | 128 | 128 | 128 | 128 |
| 128 | 128 | 128 | 128 | 128 | 128 | 128 | 128 | 128 | 128 | 128 | 128 | 128 | 128 | 128 |
| 128 | 128 | 128 | 128 | 128 | 128 | 128 | 128 | 128 | 128 | 128 | 128 | 128 | 128 | 128 |
| 128 | 128 | 128 | 128 | 128 | 128 | 128 | 128 | 128 | 128 | 128 | 128 | 128 | 128 | 128 |

F I G. 9B

IMAGE DATA HAVING UNDERGONE SCREEN PROCESSING

FIG. 9C

BOUNDARY-REPLACEMENT IMAGE DATA

| 0 | 0 | 0 | 0 | 0 | 0 | 0 | 0 | 0 | 0 | 0 | 0 | 128 | 255 | 0 |
| 0 | 0 | 0 | 0 | 0 | 0 | 0 | 0 | 0 | 0 | 0 | 128 | 0 | 255 | 0 |
| 0 | 0 | 0 | 0 | 0 | 0 | 0 | 0 | 0 | 0 | 128 | 255 | 0 | 0 | 0 |
| 0 | 0 | 0 | 0 | 0 | 0 | 0 | 0 | 0 | 128 | 255 | 0 | 0 | 0 | 255 |
| 0 | 0 | 0 | 0 | 0 | 0 | 0 | 0 | 128 | 255 | 0 | 255 | 0 | 0 | 0 |
| 0 | 0 | 0 | 0 | 0 | 0 | 0 | 128 | 255 | 0 | 0 | 255 | 255 | 255 | 255 |
| 0 | 0 | 0 | 0 | 0 | 0 | 128 | 255 | 0 | 0 | 255 | 255 | 0 | 255 | 0 |
| 0 | 0 | 0 | 0 | 0 | 128 | 255 | 0 | 0 | 255 | 0 | 255 | 255 | 0 | 0 |
| 0 | 0 | 0 | 0 | 128 | 0 | 255 | 0 | 255 | 255 | 255 | 255 | 0 | 0 | 0 |
| 0 | 0 | 0 | 128 | 255 | 0 | 0 | 255 | 255 | 255 | 255 | 255 | 0 | 0 | 255 |
| 0 | 0 | 128 | 255 | 0 | 0 | 255 | 0 | 0 | 255 | 255 | 0 | 255 | 0 | 0 |
| 0 | 128 | 255 | 0 | 0 | 255 | 255 | 0 | 0 | 0 | 255 | 0 | 255 | 255 | 0 |
| 128 | 255 | 0 | 0 | 255 | 255 | 0 | 0 | 0 | 255 | 0 | 255 | 255 | 0 | 0 |
| 255 | 0 | 0 | 0 | 255 | 255 | 255 | 255 | 255 | 0 | 0 | 255 | 255 | 255 | 255 |
| 0 | 0 | 255 | 0 | 0 | 0 | 255 | 255 | 0 | 0 | 255 | 0 | 0 | 255 | 255 | 0 |

FIG. 9D

CORRECTED IMAGE DATA (BEFORE QUANTIZATION) WHEN SAME PROCESSING AS THAT IN FIRST EMBODIMENT IS PERFORMED

| 0 | 0 | 0 | 0 | 0 | 0 | 0 | 0 | 0 | 146 | 255 |
|---|---|---|---|---|---|---|---|---|---|---|
| 0 | 0 | 0 | 0 | 0 | 0 | 0 | 0 | 146 | 255 | 18 |
| 0 | 0 | 0 | 0 | 0 | 0 | 0 | 146 | 255 | 18 | 18 |
| 0 | 0 | 0 | 0 | 0 | 0 | 146 | 18 | 18 | 18 | 255 |
| 0 | 0 | 0 | 0 | 0 | 146 | 255 | 255 | 18 | 0 | 0 |
| 0 | 0 | 0 | 0 | 146 | 255 | 18 | 18 | 18 | 255 | 0 |
| 0 | 0 | 0 | 146 | 255 | 18 | 18 | 0 | 255 | 255 | 0 |
| 0 | 0 | 146 | 18 | 18 | 18 | 255 | 255 | 255 | 255 | 255 |
| 0 | 146 | 255 | 255 | 18 | 0 | 0 | 255 | 255 | 255 | 255 |
| 146 | 255 | 18 | 18 | 18 | 255 | 0 | 0 | 255 | 255 | 0 |
| 255 | 18 | 18 | 18 | 255 | 255 | 18 | 0 | 255 | 0 | 0 |

FIG. 9E

CORRECTED IMAGE DATA (BEFORE QUANTIZATION)

| 0 | 0 | 0 | 0 | 0 | 0 | 0 | 0 | 0 | 146 | 255 |
|---|---|---|---|---|---|---|---|---|---|---|
| 0 | 0 | 0 | 0 | 0 | 0 | 0 | 0 | 146 | 255 | 0 |
| 0 | 0 | 0 | 0 | 0 | 0 | 0 | 146 | 255 | 0 | 0 |
| 0 | 0 | 0 | 0 | 0 | 0 | 146 | 0 | 0 | 0 | 255 |
| 0 | 0 | 0 | 0 | 0 | 146 | 255 | 255 | 0 | 0 | 0 |
| 0 | 0 | 0 | 0 | 146 | 255 | 0 | 0 | 0 | 255 | 0 |
| 0 | 0 | 0 | 146 | 255 | 0 | 0 | 0 | 255 | 255 | 0 |
| 0 | 0 | 146 | 0 | 0 | 0 | 255 | 255 | 255 | 255 | 255 |
| 0 | 146 | 255 | 255 | 0 | 0 | 0 | 255 | 255 | 255 | 255 |
| 146 | 255 | 0 | 0 | 0 | 255 | 0 | 0 | 255 | 255 | 0 |
| 255 | 0 | 0 | 0 | 255 | 255 | 0 | 0 | 255 | 0 | 0 |

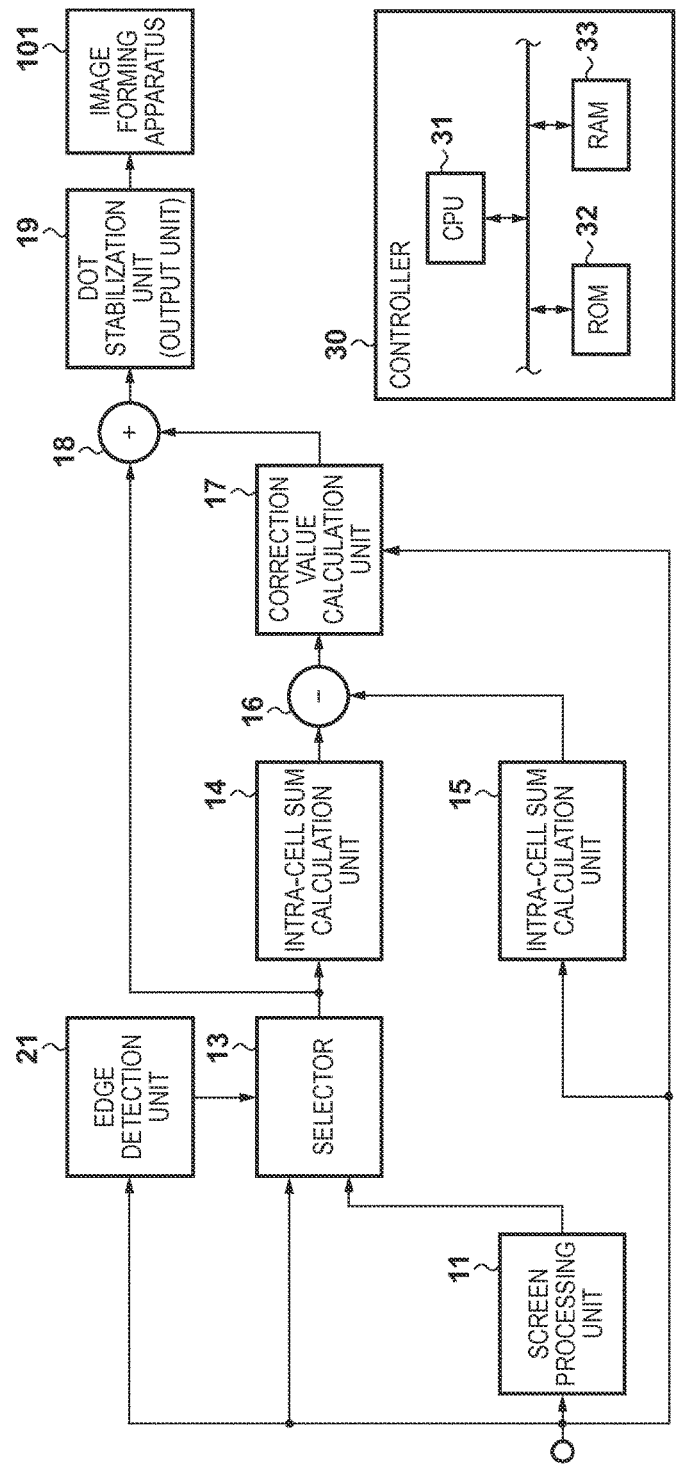
F I G. 10

F I G. 13

BOUNDARY-REPLACEMENT IMAGE DATA

| 0 | 0 | 0 | 0 | 0 | 255 | 255 | 0 | 0 | 0 | 0 | 0 | 255 | 255 | 0 |
|---|---|---|---|---|-----|-----|---|---|---|---|---|-----|-----|---|
| 0 | 0 | 0 | 0 | 255 | 255 | 255 | 255 | 0 | 0 | 0 | 255 | 255 | 255 | 255 |
| 0 | 0 | 0 | 0 | 255 | 255 | 255 | 255 | 0 | 0 | 0 | 255 | 255 | 255 | 255 |
| 0 | 0 | 187 | 0 | 0 | 0 | 255 | 255 | 0 | 0 | 0 | 0 | 255 | 255 | 0 |
| 0 | 0 | 187 | 255 | 0 | 0 | 0 | 0 | 255 | 255 | 0 | 0 | 0 | 0 | 0 |
| 0 | 0 | 187 | 255 | 0 | 0 | 0 | 255 | 255 | 255 | 255 | 0 | 0 | 0 | 0 |
| 0 | 0 | 0 | 187 | 0 | 0 | 0 | 0 | 255 | 255 | 255 | 255 | 0 | 0 | 0 |
| 0 | 0 | 0 | 0 | 187 | 0 | 0 | 0 | 255 | 255 | 0 | 0 | 0 | 0 | 0 |
| 0 | 0 | 0 | 0 | 0 | 187 | 255 | 0 | 0 | 0 | 0 | 255 | 255 | 0 | 0 |
| 0 | 0 | 0 | 0 | 0 | 0 | 187 | 255 | 0 | 0 | 0 | 255 | 255 | 255 | 255 |
| 0 | 0 | 0 | 0 | 0 | 0 | 187 | 0 | 0 | 0 | 0 | 255 | 255 | 255 | 0 |
| 0 | 0 | 0 | 0 | 0 | 0 | 0 | 187 | 0 | 0 | 255 | 255 | 0 | 0 | 0 |
| 0 | 0 | 0 | 0 | 0 | 0 | 0 | 0 | 187 | 255 | 0 | 0 | 0 | 0 | 0 |
| 0 | 0 | 0 | 0 | 0 | 0 | 0 | 0 | 0 | 187 | 255 | 0 | 0 | 0 | 0 |
| 0 | 0 | 0 | 0 | 0 | 0 | 0 | 0 | 0 | 187 | 0 | 0 | 0 | 0 | 0 |
| 0 | 0 | 0 | 0 | 0 | 0 | 0 | 0 | 0 | 0 | 187 | 0 | 0 | 0 | 0 |
| 0 | 0 | 0 | 0 | 0 | 0 | 0 | 0 | 0 | 0 | 0 | 187 | 255 | 0 | 0 |

F I G. 14A

CORRECTED IMAGE DATA (BEFORE QUANTIZATION)

| 0 | 0 | 0 | 0 | 0 | 0 | 0 | 0 | 0 | 187 | 255 |
|---|---|---|---|---|---|---|---|---|---|---|
| 0 | 0 | 0 | 0 | 0 | 0 | 0 | 0 | 187 | 255 | 0 |
| 0 | 0 | 0 | 0 | 0 | 0 | 0 | 187 | 0 | 0 | 0 |
| 0 | 0 | 0 | 0 | 0 | 0 | 193 | 6 | 6 | 0 | 0 |
| 0 | 0 | 0 | 0 | 0 | 193 | 255 | 6 | 6 | 0 | 0 |
| 0 | 0 | 0 | 0 | 193 | 255 | 6 | 0 | 0 | 0 | 0 |
| 0 | 0 | 0 | 193 | 6 | 6 | 6 | 0 | 255 | 255 | 0 |
| 0 | 0 | 187 | 0 | 0 | 0 | 0 | 255 | 255 | 255 | 255 |
| 0 | 187 | 255 | 0 | 0 | 0 | 0 | 255 | 255 | 255 | 255 |
| 187 | 255 | 0 | 0 | 0 | 0 | 0 | 0 | 255 | 255 | 0 |
| 0 | 0 | 0 | 0 | 255 | 255 | 0 | 0 | 0 | 0 | 0 |

F I G. 14B

CORRECTED IMAGE DATA (AFTER QUANTIZATION)

| 0 | 0 | 0 | 0 | 0 | 0 | 0 | 0 | 0 | 187 | 255 |
|---|---|---|---|---|---|---|---|---|---|---|
| 0 | 0 | 0 | 0 | 0 | 0 | 0 | 0 | 187 | 255 | 0 |
| 0 | 0 | 0 | 0 | 0 | 0 | 0 | 187 | 0 | 0 | 0 |
| 0 | 0 | 0 | 0 | 0 | 0 | 187 | 0 | 0 | 0 | 0 |
| 0 | 0 | 0 | 0 | 0 | 187 | 255 | 0 | 0 | 0 | 0 |
| 0 | 0 | 0 | 0 | 187 | 255 | 0 | 0 | 0 | 0 | 0 |
| 0 | 0 | 0 | 187 | 0 | 0 | 0 | 0 | 255 | 255 | 0 |
| 0 | 0 | 187 | 0 | 0 | 0 | 0 | 255 | 255 | 255 | 255 |
| 0 | 187 | 255 | 0 | 0 | 0 | 0 | 255 | 255 | 255 | 255 |
| 187 | 255 | 0 | 0 | 0 | 0 | 0 | 0 | 255 | 255 | 0 |
| 0 | 0 | 0 | 0 | 255 | 255 | 0 | 0 | 0 | 0 | 0 |

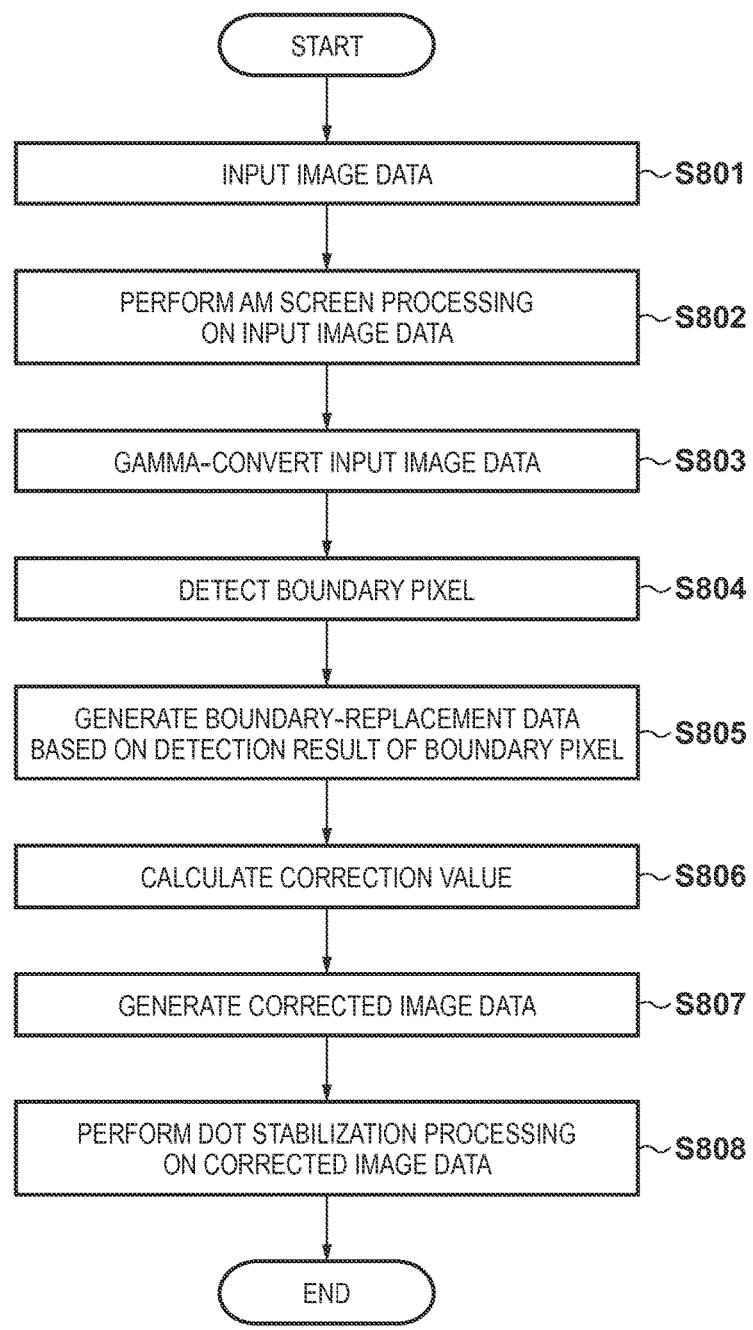

FIG. 17A

BOUNDARY-REPLACEMENT IMAGE DATA

| 0 | 0 | 0 | 0 | 0 | 0 | 0 | 0 | 0 | 0 | 0 | 0 | 0 | 0 | 187 | 0 | 0 |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 187 | 0 | 0 | 0 |
| 0 | 0 | 0 | 0 | 0 | 0 | 0 | 0 | 0 | 0 | 0 | 0 | 187 | 0 | 0 | 0 | 0 |
| 0 | 0 | 0 | 0 | 0 | 0 | 0 | 0 | 0 | 0 | 0 | 187 | 0 | 0 | 0 | 0 | 0 |
| 0 | 0 | 0 | 0 | 0 | 0 | 0 | 0 | 0 | 0 | 187 | 0 | 0 | 0 | 255 | 255 | 0 |
| 0 | 0 | 0 | 0 | 0 | 0 | 0 | 0 | 0 | 187 | 0 | 0 | 0 | 255 | 255 | 255 | 255 |
| 0 | 0 | 0 | 0 | 0 | 0 | 0 | 0 | 187 | 0 | 0 | 0 | 0 | 255 | 255 | 255 | 255 |
| 0 | 0 | 0 | 0 | 0 | 0 | 0 | 187 | 0 | 0 | 0 | 0 | 0 | 255 | 255 | 0 | 0 |
| 0 | 0 | 0 | 0 | 0 | 0 | 187 | 0 | 0 | 0 | 255 | 255 | 0 | 0 | 0 | 0 | 0 |
| 0 | 0 | 0 | 0 | 0 | 187 | 0 | 0 | 0 | 255 | 255 | 255 | 255 | 0 | 0 | 0 | 0 |
| 0 | 0 | 0 | 0 | 187 | 0 | 0 | 0 | 0 | 255 | 255 | 255 | 255 | 0 | 0 | 0 | 0 |
| 0 | 0 | 0 | 187 | 0 | 0 | 0 | 0 | 0 | 255 | 255 | 0 | 0 | 0 | 0 | 0 | 0 |
| 0 | 0 | 187 | 0 | 0 | 0 | 255 | 255 | 0 | 0 | 0 | 0 | 0 | 255 | 255 | 0 | 0 |
| 0 | 187 | 0 | 0 | 0 | 255 | 255 | 255 | 255 | 0 | 0 | 0 | 255 | 255 | 255 | 255 | 255 |
| 187 | 0 | 0 | 0 | 0 | 255 | 255 | 255 | 255 | 0 | 0 | 0 | 255 | 255 | 255 | 255 | 255 |
| 0 | 0 | 0 | 0 | 0 | 0 | 255 | 255 | 0 | 0 | 0 | 0 | 0 | 255 | 255 | 0 | 0 |

FIG. 17B

CORRECTED IMAGE DATA (BEFORE QUANTIZATION)

| 0 | 0 | 0 | 0 | 0 | 0 | 0 | 0 | 0 | 0 | 204 |
|---|---|---|---|---|---|---|---|---|---|---|
| 0 | 0 | 0 | 0 | 0 | 0 | 0 | 0 | 0 | 204 | 17 |
| 0 | 0 | 0 | 0 | 0 | 0 | 0 | 0 | 204 | 17 | 17 |
| 0 | 0 | 0 | 0 | 0 | 0 | 0 | 204 | 17 | 17 | 17 |
| 0 | 0 | 0 | 0 | 0 | 0 | 204 | 17 | 17 | 0 | 0 |
| 0 | 0 | 0 | 0 | 0 | 204 | 17 | 17 | 17 | 0 | 0 |
| 0 | 0 | 0 | 0 | 204 | 17 | 17 | 0 | 0 | 0 | 0 |
| 0 | 0 | 0 | 204 | 17 | 17 | 17 | 0 | 0 | 0 | 0 |
| 0 | 0 | 204 | 17 | 17 | 0 | 0 | 0 | 0 | 0 | 0 |
| 0 | 204 | 17 | 17 | 17 | 0 | 0 | 0 | 0 | 0 | 0 |
| 204 | 17 | 17 | 0 | 0 | 0 | 0 | 0 | 0 | 0 | 0 |

▨ UNSTABLE DOT

PERFORMING HALFTONE PROCESSING USING INTRA-CELL SUM VALUE DIFFERENCES APPLIED SO AS TO CORRECT BOUNDARY PIXELS

BACKGROUND OF THE INVENTION

Field of the Invention

The present invention relates to halftone processing.

Description of the Related Art

Image processing apparatuses in which an image represented by image data is reproduced using a digital printer such as a laser beam printer have become widespread. To reproduce the halftone of an image, a method of performing tone reproduction by halftone processing is employed generally.

Dot concentrate type halftone processing (AM screen processing) using an ordered dither method is processing of deciding an output value by comparison with a threshold which varies periodically. The AM screen processing can provide a satisfactory halftone processing result with respect to an electrophotographic process because halftone dots of the same shape are formed at equal intervals at the flat portion of an image.

However, in AM screen processing for an image having a periodic pattern, like halftone dots, or a character or fine line portion, the period of the AM screen (period of the threshold) and a high-frequency component contained in an image interfere with each other. Especially when a periodic pattern close to the period of the AM screen is input, a strong interference occurs and a periodic fringe called moiré appears.

In AM screen processing, the tone is expressed by the dot area, so the spatial resolution expressible by halftone decreases. The edge portion of an image is expressed by dots arranged stepwise, causing degradation of the image quality, called "jaggy." On a low-density fine line, the density may fluctuate depending on the position of the line, or part of the fine line may be lost.

Japanese Patent Laid-Open No. 2010-074627 (literature 1) discloses a method of processing an image by using a plurality of different screens, deciding, based on the feature analysis result of the image, the composition ratio of processing results using the respective screens, and outputting an image having undergone composition processing.

Japanese Patent Laid-Open No. 2010-245591 (literature 2) discloses a method of determining the edge portion and non edge portion of an image, and processing the edge portion and non edge portion using different screens. Literature 2 also discloses an edge determination method of determining that a pixel adjacent to a line ("negative line" in literature 2) of a lower density than the background density is a non edge portion.

The methods disclosed in literatures 1 and 2 require a processing measurement for performing a plurality of different screen processes, and an analysis measurement for performing feature analysis of an image, thus increasing the circuit size of the halftone processing unit. Also, pixels at a mixing portion of different screen processes and a switching portion of screen processing stand out and may be recognized as degradation of the image quality.

Japanese Patent Laid-Open No. 2005-252583 (literature 3) discloses a method of combining an ordered dither method and error diffusion method (FM screen), and reducing the deviation of an error between a conversion value in dither processing and an output value. According to the method disclosed in literature 3, which of ordered dither processing and error diffusion processing is to be applied needs to be selected prior to halftone processing of each pixel. It is difficult to appropriately make this selection using a simple selection measurement.

SUMMARY OF THE INVENTION

In one aspect, an image processing apparatus comprising: a screen processing unit configured to perform screen processing on input image data; a first detection unit configured to detect a boundary pixel adjacent to a white pixel in the input image data; and a first output unit configured to output output image data based on a result of the detection, wherein, in a case where a pixel of interest is detected as the boundary pixel by the first detection unit, the first output unit outputs, as an output value of the pixel of interest, a value based on a pixel value of the pixel of interest in the input image data, wherein, in a case where a pixel of interest is not detected as the boundary pixel by the first detection unit, the first output unit outputs, as an output value of the pixel of interest, a value based on a pixel value of the pixel of interest in image data on which the screen processing is performed.

According to the aspect, the drawbacks of screen processing can be compensated by a simple method, and a satisfactory halftone processing result can be obtained.

Further features of the present invention will become apparent from the following description of exemplary embodiments with reference to the attached drawings.

BRIEF DESCRIPTION OF THE DRAWINGS

FIG. 2 is a view showing an example of the matrix table of a dither matrix used in a screen processing unit.

FIG. 5A is a view showing an example of input image data.

FIG. 5B is a view showing an example of image data having undergone screen processing.

FIG. 5C is a view showing an example of boundary pixel data.

FIG. 5D is a view showing an example of boundary-replacement image data.

FIG. 5E is a view showing an example of corrected image data.

FIG. 5F is a view showing an example of output image data obtained by quantizing the corrected image data.

FIG. 6 is a block diagram showing the arrangement of an image processing apparatus which performs halftone processing according to the second embodiment.

FIG. 7 is a view showing the reference region of a white fine line detection unit.

FIGS. 8A to 8M are views showing the reference region of a boundary detection unit, and conditions to determine a pixel of interest as a boundary pixel.

FIG. 9A is a view showing an example of input image data.

FIG. 9B is a view showing an example of image data having undergone screen processing.

FIG. 9C is a view showing an example of boundary-replacement image data.

FIG. 9D is a view showing an example of corrected image data when the same processing as that in the first embodiment is performed in the third embodiment.

FIG. 9E is a view showing an example of corrected image data in the third embodiment.

FIG. 10 is a block diagram showing the arrangement of an image processing apparatus which performs halftone processing according to the fourth embodiment.

FIG. 13 is a view showing an example of boundary-replacement image data in the fifth embodiment.

FIG. 14A is a view showing an example of corrected image data before quantization in the fifth embodiment.

FIG. 14B is a view showing an example of corrected image data after quantization in the fifth embodiment.

FIG. 15 is a flowchart for explaining image processing.

FIG. 17A is a view showing an example of boundary-replacement image data in the sixth embodiment.

FIG. 17B is a view showing an example of corrected image data before quantization in the sixth embodiment.

DESCRIPTION OF THE EMBODIMENTS

Halftone processing (image processing) according to embodiments of the present invention will now be described in detail with reference to the accompanying drawings. The function of image processing according to the embodiments described below can be implemented by supplying the program of the image processing to a computer apparatus and executing it.

First Embodiment

[Apparatus Arrangement]

Figure 1:
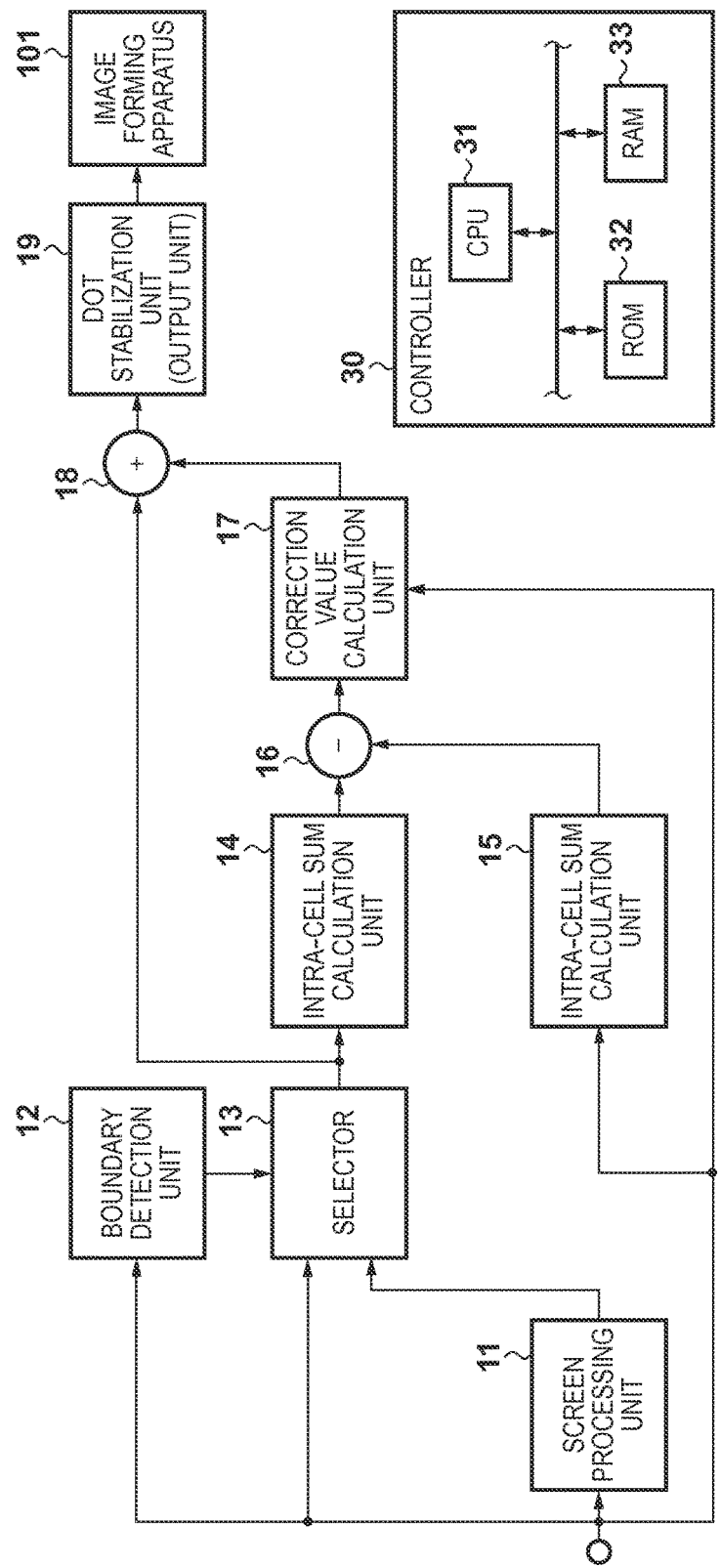
FIG. 1 is a block diagram showing the arrangement of an image processing apparatus which performs halftone processing according to an embodiment.

The arrangement of an image processing apparatus which performs halftone processing according to the embodiment is shown in the block diagram of FIG. 1.

A screen processing unit 11 performs halftone processing (AM screen processing) using an AM screen on multi-value input image data to reduce the number of tones of the input image data. A boundary detection unit 12 detects, as a boundary pixel from input image data, a pixel (to be referred to as a "non white pixel" hereinafter) which is adjacent to a white pixel and is not a white pixel.

Based on the detection result of the boundary detection unit 12, a selector 13 selects input image data for a boundary pixel, and image data output from the screen processing unit 11 for a pixel (to be referred to as a "non boundary pixel" hereinafter) other than a boundary pixel. As a result, input image data is selectively output from the selector 13 for a boundary pixel, and image data having undergone AM screen processing is selectively output for a non boundary pixel. In other words, the selector 13 outputs image data (to be referred to as "boundary-replacement image data" hereinafter) obtained by replacing, with input image data, image data of a boundary pixel in image data having undergone AM screen processing.

Intra-cell sum calculation units 14 and 15 perform the same operation, and calculate the sum of image data in the range of a cell set in the screen processing unit 11. The intra-cell sum calculation unit 14 serving as the first calculation unit calculates the first sum value in the cell of boundary-replacement image data output from the selector 13. To the contrary, the intra-cell sum calculation unit 15 serving as the second calculation unit calculates the second sum value in the cell of input image data. Note that the "cell" will be described later.

A subtracter 16 obtains the difference (to be referred to as an "intra-cell sum value difference" hereinafter) between the first sum value and the second sum value. A correction value calculation unit 17 obtains the correction value of each pixel from the intra-cell sum value difference. In the embodiment, to prevent a blur of an edge, correction is not performed on a pixel having a pixel value of 0 (to be referred to as a "zero pixel" hereinafter), and is performed on a pixel having a pixel value exceeding 0 (to be referred to as a "significant pixel" hereinafter). More specifically, the correction value calculation unit 17 outputs the correction value=0 for a zero pixel of input image data. For a significant pixel of the input image data, the correction value calculation unit 17 outputs a correction value obtained by dividing an intra-cell sum value difference by the number of effective pixels. The number of effective pixels corresponds to the number of correctable pixels in a cell, and is the number of significant pixels of input image data in a cell.

An adder 18 adds a correction value output from the correction value calculation unit 17 to boundary-replacement image data output from the selector 13. A dot stabilization unit 19 is an output unit configured to convert corrected image data output from the adder 18 into image data with which an image forming apparatus 101 can stably output an image. Image data output from the dot stabilization unit 19 is output to the image forming apparatus 101, forming an image.

Note that the dot stabilization unit 19 performs tone conversion to make the number of tones of corrected image data coincide with the number of tones reproducible by the image forming apparatus 101. At this time, the dot stabilization unit 19 may tone-convert (quantize) even a correction value output from the correction value calculation unit 17 and add the converted correction value to boundary-replacement image data output from the selector 13. When output image data deviates from the input range of the dot stabilization unit 19, the adder 18 restricts (clips) the image data to a lower limit value of 0 or an upper limit value (for example, 255), and then outputs the image data to the dot stabilization unit 19.

The following processing is executed by using the above units and supplying a program for controlling this processing to a microprocessor (CPU) 31 in a controller 30. The CPU 31 executes the program stored in a non-volatile memory such as a read-only memory (ROM) 32 using a random access memory (RAM) 33 as a work memory. Alternatively, it is possible to perform the following processing by supplying a program for implementing this processing to a computer while hardware units such as the above units are not used.

●Halftone Processing

Figure 2:
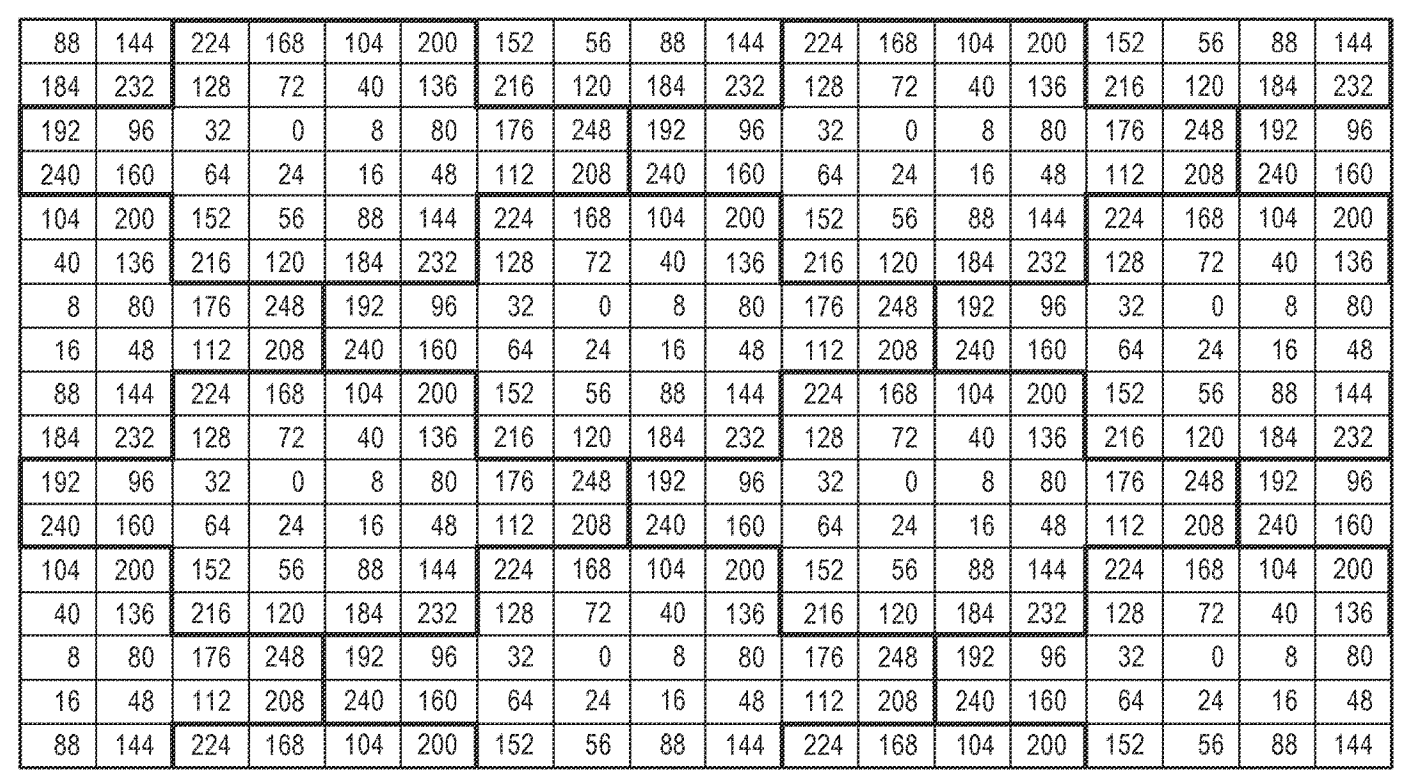

FIG. 2 shows an example of the matrix table of a dither matrix used in the screen processing unit 11. Each frame in the matrix table shown in FIG. 2 corresponds to a pixel, and a numerical value in each frame indicates a threshold. In the embodiment, the input range of the dither matrix is 0 to 255, and its output is a binary value of 0 or 255. That is, when the image data is equal to or larger than 0 and equal to or smaller than the threshold, the output value is 0. When the image data is larger than the threshold, the output value is 255. The dither matrix according to the embodiment has a shape formed from 32 pixels represented by each thick line in FIG. 2, and can express a tone of 33 levels as a dot area. In the embodiment, a region corresponding to the dither matrix is called a "cell".

Figures 3, 4A, 4B:
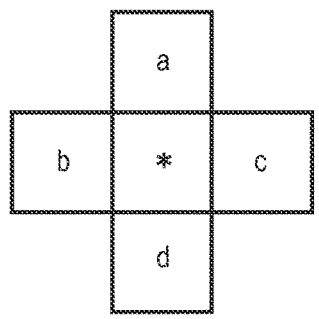
FIG. 3 is a view showing a reference region when a boundary detection unit detects a boundary pixel.
FIGS. 4A and 4B are views for explaining an example of detection of a boundary pixel.

FIG. 3 shows a reference region when the boundary detection unit 12 detects a boundary pixel. In FIG. 3, "*" is a pixel of interest. MIN is a minimum value among the values of four adjacent pixels surrounding the pixel of interest. When the value of the pixel of interest exceeds 0 and the minimum value is equal to or smaller than a predetermined threshold (MIN≤TH), it is determined that the pixel of interest is a boundary pixel. Note that the threshold TH may be a fixed value or a value which is settable in accordance with processing. Particularly when the threshold TH=0 is set, a boundary pixel in a case in which a pixel having the pixel value of 0 is defined as a white pixel can be detected.

An example of detection of a boundary pixel will be explained with reference to FIGS. 4A and 4B. In both FIGS. 4A and 4B, a circled pixel is a pixel of interest, and the threshold TH=0. In the example of FIG. 4A, the pixel of interest has a value of 64, two, upper and left pixels have a pixel value of 0, and the minimum value MIN is 0. Hence, the value of the pixel of interest>0, MIN≤TH, and it is determined that the pixel of interest is a boundary pixel. To the contrary, in the example of FIG. 4B, the pixel of interest has a value of 64, four adjacent pixels have values>0, and the minimum value MIN is 32. Thus, the condition of MIN≤TH is not satisfied, and it is determined that the pixel of interest is not a boundary pixel.

Figure 5B:
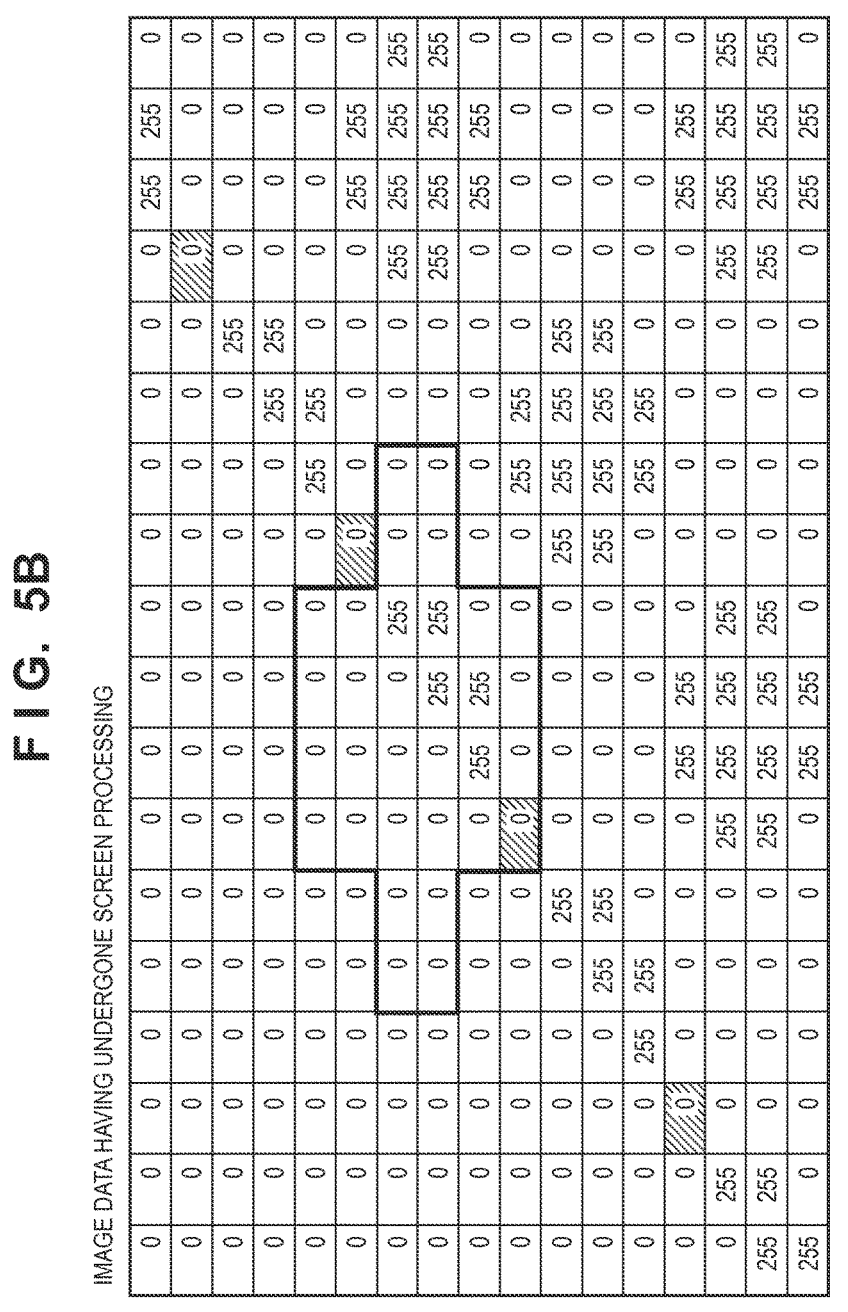

FIGS. 5A to 5F are views for explaining halftone processing according to the embodiment. A region surrounded by a thick line represents a cell in the AM screen. FIG. 5A shows an example of input image data. FIG. 5B shows an example of image data having undergone screen processing. That is, when AM screen processing is performed on the image data shown in FIG. 5A, the processing result shown in FIG. 5B is obtained.

Figure 5C:
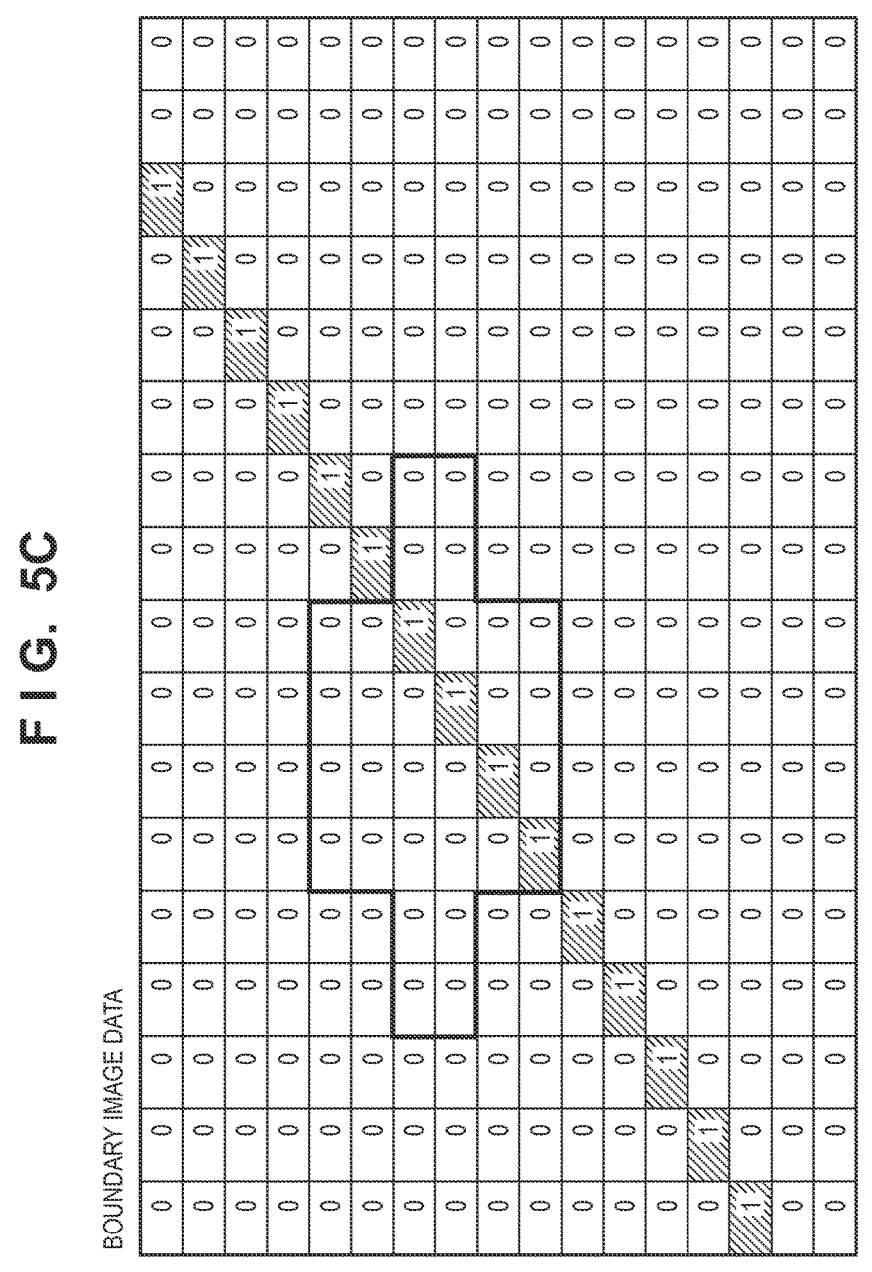

FIG. 5C shows an example of boundary pixel data. When boundary pixels are detected from the image data shown in FIG. 5A, the detection result shown in FIG. 5C is obtained. In FIG. 5C, '1' indicates a boundary pixel, and '0' indicates a non boundary pixel. As represented by hatching in FIG. 5B, some boundary pixels are changed to have the value "0" by screen processing, and the continuity of the edge shown in FIG. 5A is lost.

FIG. 5D shows an example of boundary-replacement image data output from the selector 13. As shown in FIG. 5D, the pixel value ("96" in this example) of input image data is output for a boundary pixel to restore the value of the boundary pixel and thus restore the continuity of the edge.

The intra-cell sum calculation unit 14 receives the boundary-replacement image data (FIG. 5D) output from selector 13, and calculates the sum value of image data in the cell shown in FIG. 5D by:

intra-cell sum calculation unit 14: 0×26+96×4+255× 2=894

To the contrary, the intra-cell sum calculation unit 15 receives the input image data (FIG. 5A), and calculates the sum value of image data in the cell shown in FIG. 5A by:

intra-cell sum calculation unit 15: 0×18+96×14=1, 344

The correction value calculation unit 17 outputs, as a correction value, a value obtained by dividing, by the number of effective pixels in the cell, a value obtained by subtracting an output of the intra-cell sum calculation unit 14 from an output of the intra-cell sum calculation unit 15. In FIG. 5A, the number of effective pixels in the cell is "14", and the correction value is calculated by:

(1344−894)/14=32

In the calculation of the correction value, the decimal part may be rounded down or off.

The adder 18 adds the correction value to boundary-replacement image data output from the selector 13, generating corrected image data after halftone processing. However, the corrected image data has a range of 0 to 255 and takes neither a negative value nor a value exceeding 255. That is, the corrected image data is restricted (clipped) to the range of 0 to 255 regardless of the correction value.

FIG. 5E shows an example of corrected image data output from the adder 18. In FIG. 5E, image data of a boundary pixel shown in FIG. 5D changes to 96+32=128, image data of a pixel having the value "255" remains unchanged, and image data of a pixel having the value "0" changes to 0+32=32.

Binary AM screen processing has been described above. To set input image data in a boundary pixel, halftone data is preferably output. For example, the image forming apparatus 101 controls emission of a laser beam by pulse width modulation (PWM) to form one dot by 15 divisions so that 16 tones can be expressed per dot. In this case, the dot stabilization unit 19 quantizes each pixel having a pixel value of 0 to 255 into 4 bits (16 levels). To quantize the range of 0 to 255 into 4 bits, a multiple of "17" is used as a quantization representative value for the value of image data.

FIG. 5F shows an example of output image data obtained by quantizing the corrected image data. In FIG. 5F, image data of pixels having the values "128" and "32" shown in FIG. 5E are quantized into:

INT{(128+8)/17}×17=136;

INT{(36+8)/17}×17=34;

where INT{ } is the function of outputting an integer.

The dot stabilization unit 19 corrects image data with which no dot is stably formed in image formation by the image forming apparatus 101, into image data with which a dot is stably formed. An example of this correction is the following processing. If it is detected that the value of image data after halftone processing is smaller than a predetermined value, it is determined that dot stabilization processing is necessary, and data conversion is performed to, for example, increase the value of the image data by looking up a predetermined lookup table (LUT) in accordance with the surrounding dot pattern shape. For example, different LUTs are used in accordance with a case in which the surrounding dot pattern shape is a fine line, and a case in which the pixel of interest is an isolated point.

In the embodiment, a boundary pixel often forms the edge portion of an image or a fine line represented by input image data, and is linearly connected to an adjacent boundary pixel. According to the embodiment, image data of a boundary pixel is corrected to ensure a latent image contrast between the boundary pixel and the background white pixel portion. The image forming apparatus 101 can stably form linearly connected dots. In addition, the latent image contrast with respect to background white pixels is ensured.

Thus, degradation of an image on a fine line or edge portion can be prevented, improving the image quality.

Second Embodiment

Image processing according to the second embodiment of the present invention will be described. In the second embodiment, the same reference numerals as those in the first embodiment denote the same parts, and a detailed description thereof will not be repeated.

The arrangement of an image processing apparatus which performs halftone processing according to the second embodiment is shown in the block diagram of FIG. 6. The arrangement according to the second embodiment is different from the arrangement according to the first embodiment in that a selective output from a selector 13 is based on the detection results of a white fine line detection unit 20 and boundary detection unit 12.

The white fine line detection unit 20 detects a white fine line. The boundary detection unit 12 determines that a pixel adjacent to a white fine line is a non boundary pixel. By this determination, a pixel adjacent to a white fine line is not detected as a boundary pixel, preventing degradation of the image quality in which a white fine line is impaired by stabilization processing on a pixel adjacent to the white fine line.

Figure 7:
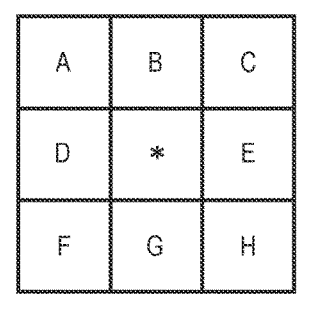

FIG. 7 shows the reference region of the white fine line detection unit 20. In FIG. 7, each frame represents a pixel, and a 3×3 pixel block serves as the reference region of the white fine line detection unit 20. A pixel indicated by "*" at the center of the 3×3 pixel block is a pixel of interest. When the value of the pixel of interest is "0", the white fine line detection unit 20 detects a white fine line. That is, if the following conditions are satisfied, the white fine line detection unit 20 determines that the pixel of interest is a pixel forming a white fine line:

```
if (value of pixel of interest == 0) {
    if (A == 0||B == 0||D == 0) {
        if (B == 0||C == 0||E == 0) {
            if (D == 0||F == 0||G == 0) {
                if (G == 0||H == 0||E == 0)
                    pixel of interest forms white fine line;
            }
        }
    }
}
where || is the OR operator.
```

The above conditions are an example of detecting a fine line of a one-pixel width. However, the line width is not limited to one pixel, and a white fine line having a line width of two or more pixels may be detected.

FIGS. 8A to 8M show the reference region of the boundary detection unit 12, and conditions to determine a pixel of interest as a boundary pixel. In FIG. 8A, each frame represents a pixel, and a 3×3 pixel block serves as the reference region of the boundary detection unit 12.

The boundary detection unit 12 determines that a pixel adjacent to a black pixel is a boundary pixel even when it is adjacent to a white fine line, in order to save the edge of a character having undergone smoothing processing (also called anti-aliasing) of making less conspicuous stepwise aliasing (jaggy) generated on an oblique line, curve, or the like.

If the following conditions are satisfied, the boundary detection unit 12 determines that the pixel of interest is a boundary pixel, in which (x, y) are the relative coordinates of a reference pixel when the coordinates of the pixel of interest are defined as (0, 0):

```
if ((0, 0) == N) {
    if ((1, 0) == W||(-1, 0) == W||(0, -1) == W||(0, 1) == W)
        pixel of interest is boundary pixel; (Figs. 8B to 8E)
    if ((-1, 0) == B && (1, 0) == NW)
        pixel of interest is boundary pixel; (Fig. 8F)
    if ((-1, 0) == NW && (1, 0) == B)
        pixel of interest is boundary pixel; (Fig. 8G)
    if ((0, -1) == NW && (0, 1) == B)
        pixel of interest is boundary pixel; (Fig. 8H)
    if ((0, -1) == B && (0, 1) == NW)
        pixel of interest is boundary pixel; (Fig. 8I)
    if ((-1, -1) == W && (0, -1)== NW && (-1, 0) == NW)
        pixel of interest is boundary pixel; (Fig. 8J)
    if ((0, -1) == NW && (1, -1) == W && (1, 0) == NW)
        pixel of interest is boundary pixel; (Fig. 8K)
    if ((1, 0) == NW && (0, 1) == NW && (1, 1) == W)
        pixel of interest is boundary pixel; (Fig. 8L)
    if ((-1, 0) == NW && (-1, 1) == W && (0, 1) == NW)
        pixel of interest is boundary pixel; (Fig. 8M)
}
where N is a halftone pixel having a value other than 0 and 255,
    W is a white pixel (value = 0) excluding a white fine line,
    NW is a pixel forming a white fine line,
    B is a black pixel having the value of 255,
and
    && is the AND operator.
```

The boundary detection unit 12 determines a boundary pixel under the above-described conditions. The boundary detection unit 12 outputs '1' for a boundary pixel, and '0' for a non boundary pixel.

According to the second embodiment, an output from the boundary detection unit 12 is '0' for a boundary portion with respect to a white fine line. The value of the pixel adjacent to the white fine line is not replaced with input image data, and thus the white fine line is not impaired. Since a pixel adjacent to a white fine line at the halftone portion of a character having undergone smoothing processing is detected as a boundary pixel, a high-quality character image free from jaggy can be reproduced. When there is no character having undergone smoothing processing, detection (FIGS. 8F to 8I) of a halftone pixel N adjacent to a black pixel B and a white pixel NW forming a fine line is unnecessary, and the processing can be simplified.

Third Embodiment

Image processing according to the third embodiment of the present invention will be described. In the third embodiment, the same reference numerals as those in the first and second embodiments denote the same parts, and a detailed description thereof will not be repeated.

The third embodiment is different from the first embodiment in processing by a correction value calculation unit 17.

Figure 9B:
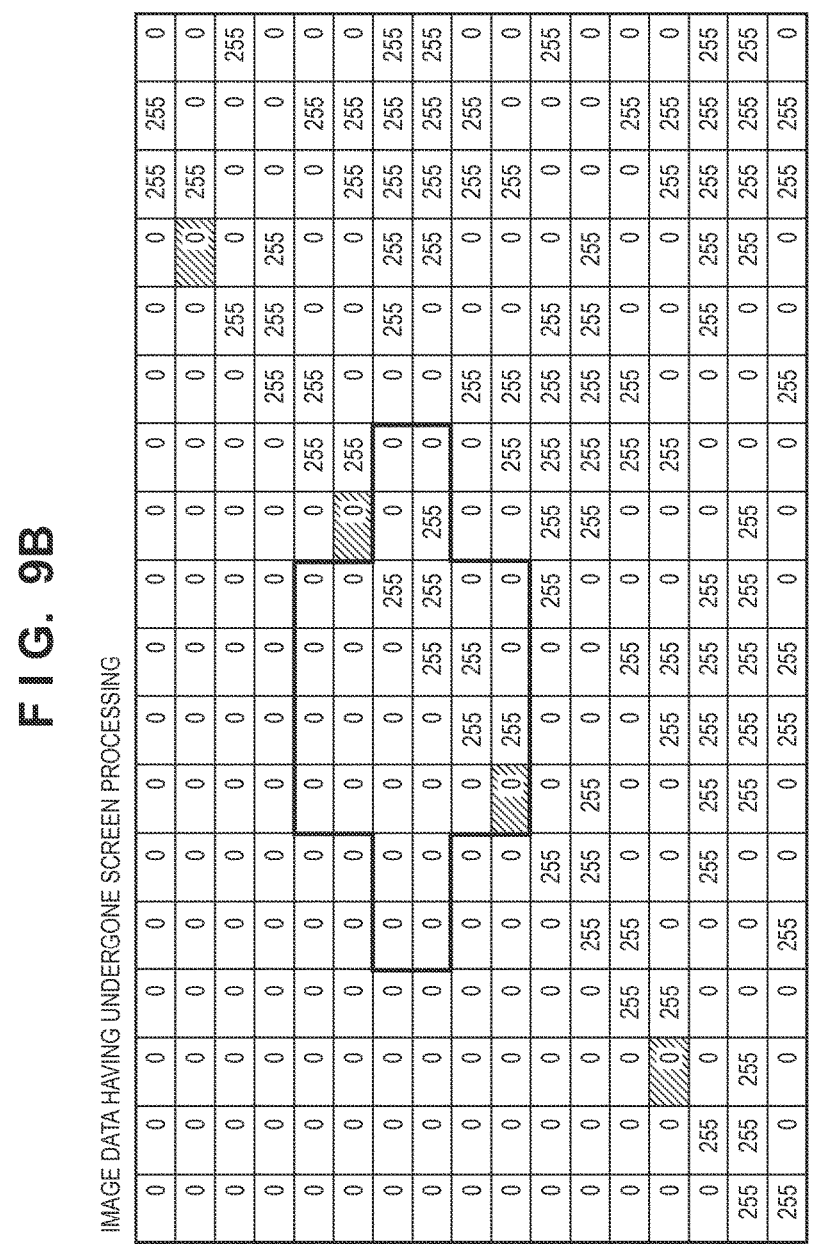

FIGS. 9A to 9E are views for explaining halftone processing according to the third embodiment. A region surrounded by a thick line represents a cell in the AM screen. FIG. 9A shows an example of input image data. FIG. 9B shows an example of image data having undergone screen processing. That is, when AM screen processing is performed on the image data shown in FIG. 9A, the processing result shown in FIG. 9B is obtained. As represented by hatching in FIG. 9B, some boundary pixels are changed to have the value "0" by screen processing, and the continuity of the edge shown in FIG. 9A is lost.

FIG. 9C shows an example of boundary-replacement image data output from a selector 13. As shown in FIG. 9C, the pixel value ("128" in this example) of input image data is output for a boundary pixel to restore the value of the boundary pixel and thus restore the continuity of the edge.

An intra-cell sum calculation unit 14 receives the boundary-replacement image data (FIG. 9C) output from the selector 13, and calculates the sum value of image data in the cell shown in FIG. 9C by:

intra-cell sum calculation unit 14: 0×24+128×4+ 255×4=1,532

In contrast, an intra-cell sum calculation unit 15 receives the input image data (FIG. 9A), and calculates the sum value of image data in the cell shown in FIG. 9A by:

intra-cell sum calculation unit 15: 0×18+128×14=1, 792

The correction value calculation unit 17 outputs, as a correction value, a value obtained by dividing, by the number of effective pixels in the cell, a value (intra-cell sum value difference) obtained by subtracting an output of the intra-cell sum calculation unit 14 from an output of the intra-cell sum calculation unit 15. In FIG. 9A, the number of effective pixels in the cell is "14", and the correction value is calculated by:

(1792−1532)/14=18

FIG. 9D shows an example of corrected image data when the same processing as that in the first embodiment is performed. In FIG. 9D, image data of a boundary pixel shown in FIG. 9C changes to 128+18=146, image data of a pixel having the value "255" remains unchanged, and image data of a pixel having the value "0" changes to 0+18=18.

Since the flat portion of the image has undergone AM screen processing, dots can be formed stably without performing correction processing. Thus, the correction value calculation unit 17 according to the third embodiment compares the calculated correction value with a predetermined threshold. If the correction value is smaller than the threshold, the correction value calculation unit 17 determines that density fluctuations in the cell are small, and a halftone pixel which should be held does not exist in input image data corresponding to the cell. Then, the correction value calculation unit 17 sets the correction value for the cell to be 0.

The processes of the correction value calculation unit 17 and an adder 18 implement correction to eliminate density fluctuations of data after screen processing. For example, dots (small dots) of low density values are formed near boundary pixels in accordance with the corrected image data shown in FIG. 9D. However, small dots hardly contribute to correction of density fluctuations, and stable dot formation is difficult. In particular, it is difficult to visually detect density fluctuations near boundary pixels. For this reason, the image quality is improved when no such small dot is reproduced.

FIG. 9E shows an example of corrected image data in the third embodiment. When the threshold to be compared with the correction value is set to be, for example, "34", image data of a value "18" hatched in FIG. 9D changes to "0", as shown in FIG. 9E, and formation of a dot can be prevented. That is, formation of a dot which hardly contributes to correction of density fluctuations and is formed unstably can be prevented, and the graininess of the image can be suppressed, improving the image quality. In other words, the threshold to be compared with the correction value guarantees a minimum pulse width of PWM in an image forming apparatus 101.

Fourth Embodiment

Image processing according to the fourth embodiment of the present invention will be described. In the fourth embodiment, the same reference numerals as those in the first to third embodiments denote the same parts, and a detailed description thereof will not be repeated.

The arrangement of an image processing apparatus which performs halftone processing according to the fourth embodiment is shown in the block diagram of FIG. 10. The arrangement according to the fourth embodiment is different from the arrangement according to the first embodiment in that an edge detection unit 21 is arranged in place of the boundary detection unit 12.

The edge detection unit 21 detects an edge portion from input image data. For example, the edge detection unit 21 calculates differences between the value of a pixel of interest and the values of four adjacent pixels surrounding the pixel of interest in the reference region shown in FIG. 3. Based on the comparison between a maximum value among the four differences and a predetermined threshold, the edge detection unit 21 detects the pixel of interest as a pixel positioned at an edge portion (to be referred to as an "edge pixel" hereinafter). Note that a pixel positioned on the high density side of an edge is detected as an edge pixel. That is, the edge pixel detection condition is:

$D\text{max}=\text{Max}\{(Di-Da),(Di-Db),(Di-Dc),(Di-Dd)\};$ if (Dmax>Th)

pixel of interest is edge pixel;

where Max{ } is the function of outputting a maximum value,

Di is the density value of a pixel of interest,

Da to Dd are the density values of pixels a to d, and

Th is the threshold.

Based on the detection result of the edge detection unit 21, a selector 13 selects input image data for an edge pixel, and image data output from a screen processing unit 11 for a pixel (to be referred to as a "non edge pixel" hereinafter) other than an edge pixel. As a result, input image data is selectively output from the selector 13 for an edge pixel, and image data having undergone AM screen processing is selectively output for a non edge pixel. In other words, the selector 13 outputs image data (to be referred to as "edge-replacement image data" hereinafter) obtained by replacing, with input image data, image data of an edge pixel in image data having undergone AM screen processing.

The following processing is the same as that in the first embodiment, and a detailed description thereof will not be repeated.

Modification of Embodiments

In the first to third embodiments, dot stabilization processing by the dot stabilization unit 19 can be controlled by supplying the detection result (boundary pixel data as shown in FIG. 5C) of the boundary detection unit 12 to the dot stabilization unit 19. Similarly, in the fourth embodiment, dot stabilization processing by the dot stabilization unit 19 can be controlled by supplying the detection result of the edge detection unit 21 to the dot stabilization unit 19.

That is, the dot stabilization unit 19 performs dot stabilization processing for a boundary pixel or edge pixel, and does not perform it for a non boundary pixel or non edge pixel. It therefore becomes possible to reliably perform dot stabilization of a boundary pixel or edge pixel, and not to perform dot stabilization of an unstable dot hardly contributing to correction of density fluctuations. Further, the arrangement of the dot stabilization unit 19 can be simplified into a dot stabilization unit 19 including only a fine line LUT.

In this manner, a plurality of screen processing measurements or a complicated edge determination measurement need not be arranged. The drawbacks of screen processing can be compensated by a simple method, and a satisfactory tone conversion result can be obtained. Especially, image data is generated by screen processing of replacing image data of a boundary pixel or edge pixel with input image data. Dots corresponding to boundary pixels or edge pixels are made to continue linearly. These dots are stabilized, greatly improving the image quality of a character or line image. For image data after screen processing, when the correction amount is small, the correction value is controlled not to perform correction. Further, dot stabilization is ON/OFF-controlled based on information of a boundary pixel or edge pixel to reliably perform dot stabilization of the boundary pixel or edge pixel. By these control operations, stabilization of an unstable dot hardly contributing to correction of density fluctuations is not performed, and a stable high-quality output becomes possible.

Fifth Embodiment

Image processing according to the fifth embodiment of the present invention will be described. In the fifth embodiment, the same reference numerals as those in the first to fourth embodiments denote the same parts, and a detailed description thereof will not be repeated.

Figure 11:
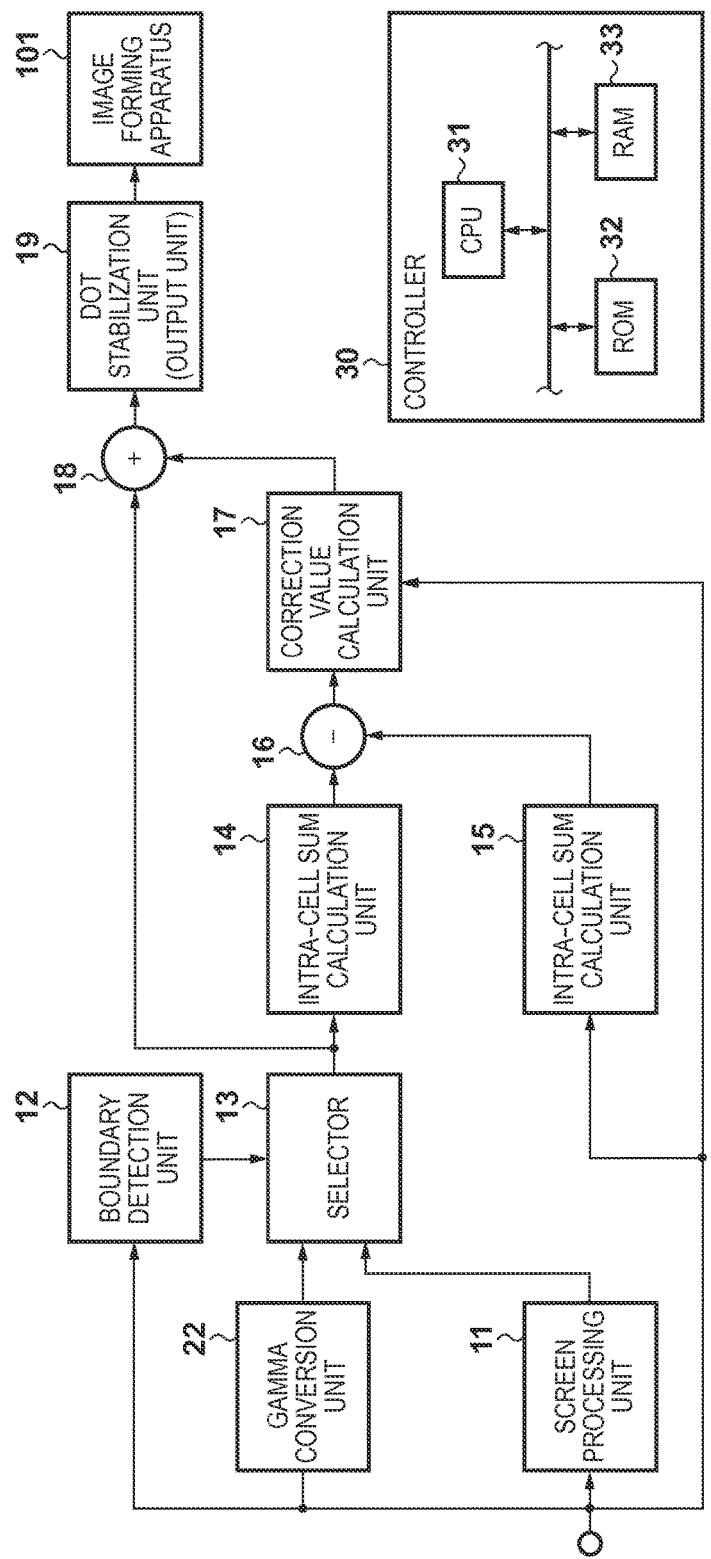
FIG. 11 is a block diagram showing the arrangement of an image processing apparatus which performs halftone processing according to the fifth embodiment.

FIG. 11 is a block diagram showing the arrangement of an image processing apparatus according to the fifth embodiment. The image processing apparatus according to the fifth embodiment includes a gamma conversion unit 22 in addition to the arrangement of the first embodiment shown in FIG. 1. The gamma conversion unit 22 performs gamma correction on input image data by using power calculation based on a gamma table or gamma coefficient, and outputs image data after gamma conversion (to be referred to as "gamma corrected image data" hereinafter).

Based on the detection result of a boundary detection unit 12, a selector 13 selects gamma corrected image data for a boundary pixel, and image data output from a screen processing unit 11 for a non boundary pixel. As a result, gamma corrected image data is selectively output from the selector 13 for a boundary pixel, and image data having undergone AM screen processing is selectively output for a non boundary pixel. In other words, the selector 13 outputs boundary-replacement image data obtained by replacing, with gamma corrected image data, image data of a boundary pixel in image data having undergone AM screen processing.

Figure 12A:
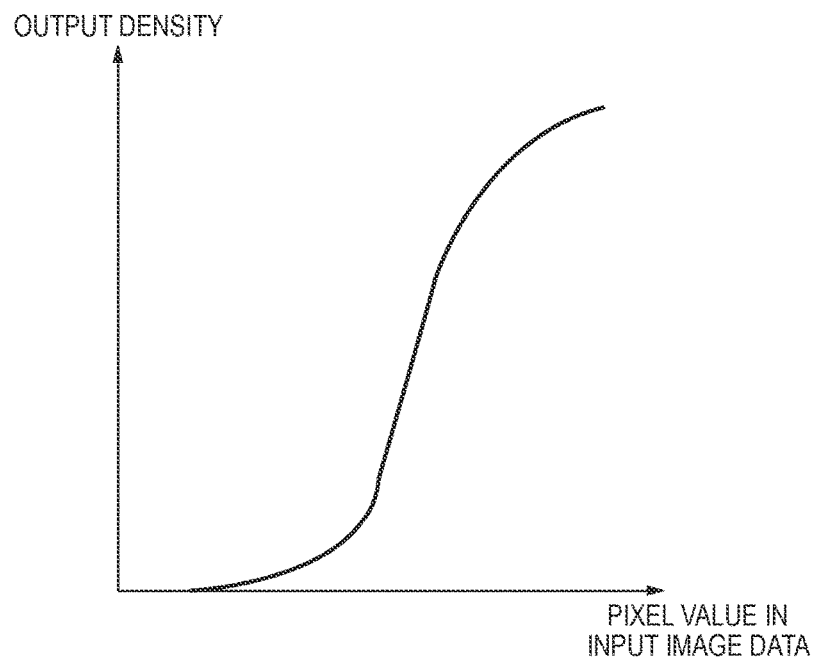
FIGS. 12A and 12B are graphs for explaining gamma conversion.
Figure 12B:
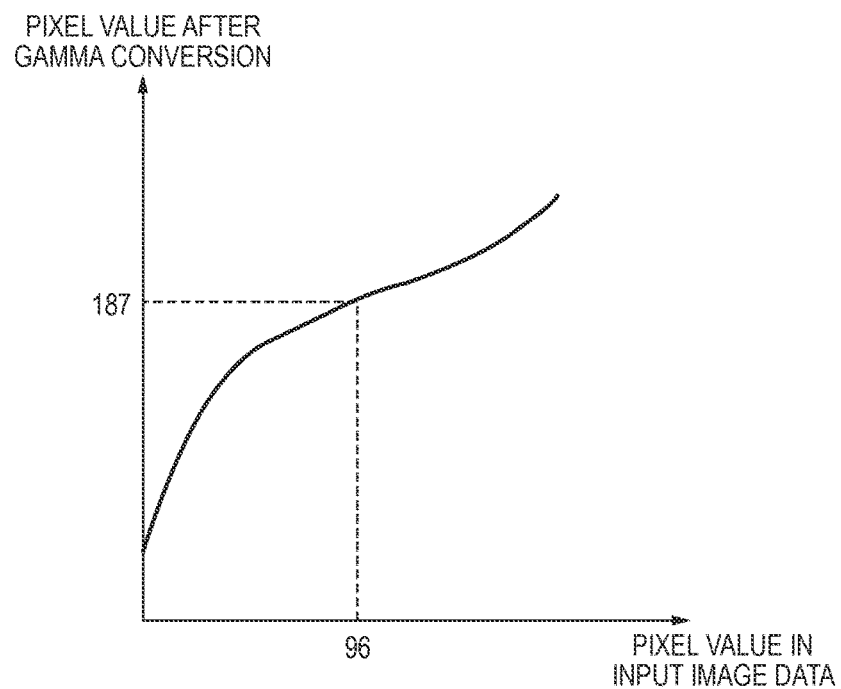

FIGS. 12A and 12B are graphs for explaining processing by the gamma conversion unit 22. FIG. 12A shows an example of a gamma characteristic representing the relationship between the pixel value of a pixel in input image data and an output density when a fine line is printed. In FIG. 12A, the abscissa represents the pixel value of a pixel in input image data, and the ordinate represents the output density. As shown in FIG. 12A, the relationship between the pixel value of a pixel in input image data and the output density is nonlinear.

To linearize the relationship between the pixel value of input image data and the output density, the gamma conversion unit 22 converts the pixel value of a pixel in the input image data by using a gamma table as shown in FIG. 12B. By using this gamma table, a pixel value to be output after gamma conversion becomes large in a region where the pixel value of a pixel in input image data is small. For example, when the pixel value of a pixel in input image data is "96", the pixel value is converted into "187" by gamma conversion using this gamma table.

Assuming that image data shown in FIG. 5A is input to the image processing apparatus, image data having undergone AM screen processing shown in FIG. 5B, and boundary pixel data shown in FIG. 5C are obtained. In the fifth embodiment, the pixel value of a pixel having the pixel value "96" in input image data is converted into "187" by the gamma conversion unit 22. Thus, the selector 13 outputs boundary-replacement image data in which the pixel value "96" of each boundary pixel shown in FIG. 5D is corrected to "187", as shown in FIG. 13. The value of the boundary pixel after gamma conversion is restored, restoring the continuity of the edge.

An intra-cell sum calculation unit 14 receives the boundary-replacement image data (FIG. 13) output from the selector 13, and calculates the sum value of image data in the cell shown in FIG. 13. In this example, the sum value is 0×26+187×4+255×2=1,258.

To the contrary, an intra-cell sum calculation unit 15 receives the input image data (FIG. 5A), and calculates the sum value of image data in the cell: 0×18+96×14=1,344, as in the first embodiment.

A correction value calculation unit 17 calculates a correction value, as in the first embodiment. In this example, the correction value is (1344−1258)/14=6.

As in the first embodiment, an adder 18 adds the correction value to boundary-replacement image data, generating corrected image data after halftone processing. However, the corrected image data has a range of 0 to 255 and takes neither a negative value nor a value exceeding 255, as described above. That is, the corrected image data is restricted (clipped) to the range of 0 to 255 regardless of the correction value.

FIG. 14A shows the corrected image data output from the adder 18. In FIG. 14A, image data of a boundary pixel shown in FIG. 13 changes to 187+6=193, image data of a pixel having the value "255" remains unchanged, and image data of a pixel having the value "0" changes to 0+6=6.

Since the boundary-replacement image data contains image data obtained by gamma-converting the pixel value of a boundary pixel, the area (density) of a dot formed based on the pixel value of each pixel in the cell may change from a density represented by each corresponding pixel in input image data. As described above, a dot stabilization unit 19 performs stabilization processing of correcting correction value-added image data in order to reduce density fluctuations. More specifically, the dot stabilization unit 19 adopts a multiple of "17" as a quantization representative value for the value of image data, as described above.

FIG. 14B shows image data obtained by quantizing corrected image data. In FIG. 14B, image data of pixels having the values "193" and "6" shown in FIG. 14A are quantized into:

INT{(193+8)/17}×17=187;

INT{(6+8)/17}×17=0;

In most cases, a boundary pixel forms an outline portion or fine line in input image data, so a boundary pixel and adjacent pixel are linearly connected by performing gamma conversion. In addition, by performing gamma conversion to increase the pixel value of a boundary pixel, image data can be corrected to ensure a latent image contrast between the boundary pixel and the white pixel portion of the background. As a result, an image forming apparatus 101 can stably form dots of linearly connected boundary pixels. Since correction is performed to ensure the latent image contrast, dot stabilization processing for a fine line can be omitted. In other words, processing by the dot stabilization unit 19 can be simplified using, for boundary-replacement image data, the pixel value of a boundary pixel having undergone gamma correction.

The sequence of image processing according to the fifth embodiment will be explained with reference to FIG. 15.

When image data is input to the image processing apparatus (S801), the screen processing unit 11 outputs image data obtained by performing AM screen processing on input image data (S802). The gamma conversion unit 22 outputs image data obtained by gamma-converting input image data (S803). The boundary detection unit 12 detects a boundary pixel in the input image data (S804). Note that the processes in steps S802 to S804 are sequential processes or parallel processes.

Based on the detection result of the boundary pixel, the selector 13 selectively outputs the image data having undergone AM screen processing or image data having undergone gamma correction (S805). The correction value calculation unit 17 calculates a correction value from a difference value between an intra-cell sum value in boundary-replacement image data output from the selector 13, and an intra-cell sum value at a corresponding position in the input image data (S806).

An adder 18 generates corrected image data by adding the correction value to the boundary-replacement image data (S807).

The dot stabilization unit 19 performs dot stabilization processing on the corrected image data (S808).

In this fashion, gamma correction is performed on boundary pixels in input image data, so the boundary portion with respect to white pixels becomes continuously linear. Therefore, the boundary portion of the white pixels holds the same resolution as that of the input image. Since the background is formed from white pixels, the boundary portion of the white pixels easily ensures the contrast of a latent image (potential on a photosensitive drum) without performing AM screen processing, and dots are easily stabilized. This greatly improves the image quality of a character or line image on the white background. Since a plurality of screen processing measurements or a complicated edge determination measurement need not be arranged, the processing (circuit) can be simplified.

Sixth Embodiment

Image processing according to the sixth embodiment of the present invention will be described. In the sixth embodiment, the same reference numerals as those in the first to fifth embodiments denote the same parts, and a detailed description thereof will not be repeated.

The above-described embodiments have explained an example in which the quantization representative values after dot stabilization processing are 0 and 96 or 255, or 0 and 187 or 255. However, the quantization representative value after dot stabilization processing sometimes becomes small. The sixth embodiment will explain an example in which it is controlled not to form a dot when the quantization representative value after dot stabilization processing is small.

Figure 16:
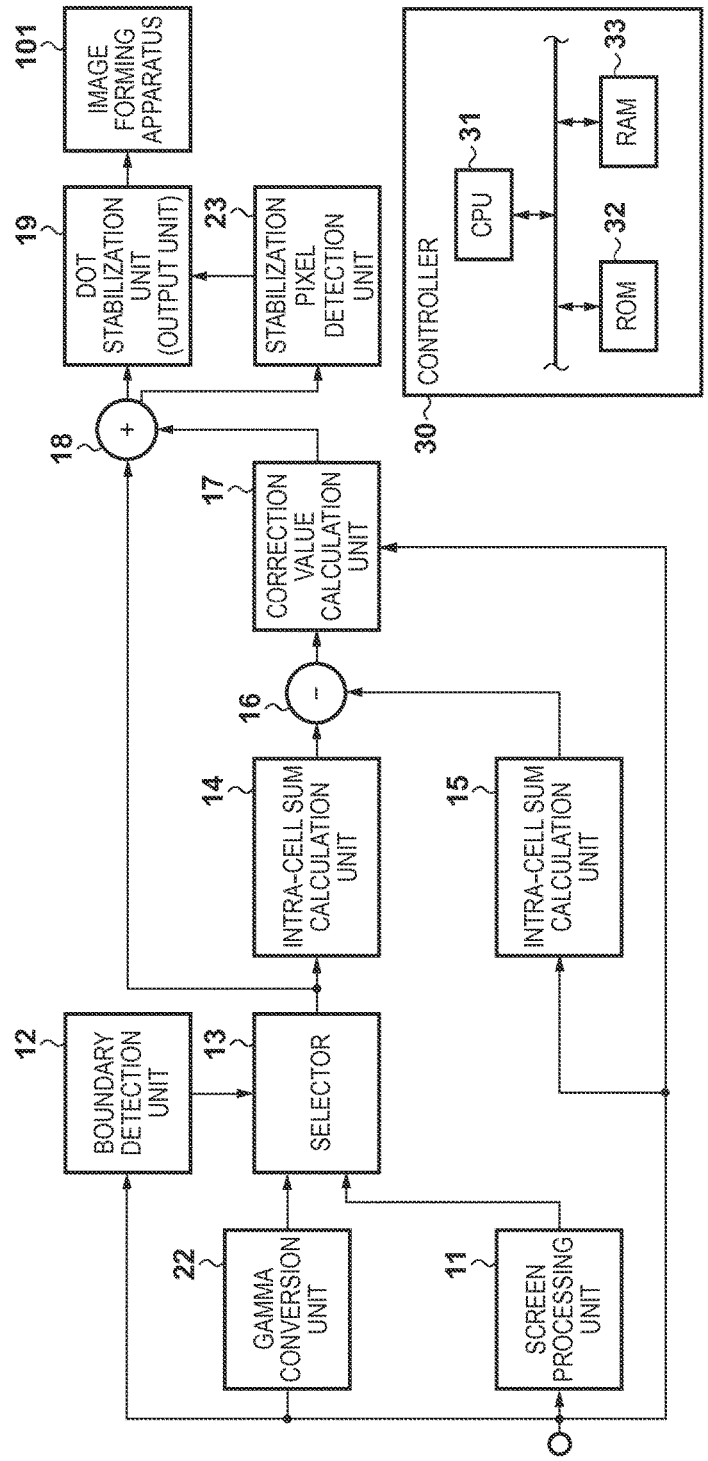
FIG. 16 is a block diagram showing the arrangement of an image processing apparatus which performs halftone processing according to the sixth embodiment.

FIG. 16 is a block diagram showing the arrangement of an image processing apparatus according to the sixth embodiment. In the sixth embodiment, a stabilization pixel detection unit 23 is added, and the operation of a dot stabilization unit 19 is different from that of the dot stabilization unit 19 in each of the other embodiments.

FIGS. 17A and 17B are views for explaining image processing in the sixth embodiment. Assume that input image data undergoes the same image processing as in the fifth embodiment, a selector 13 outputs boundary-replacement image data shown in FIG. 17A, and a correction value is added to the boundary-replacement image data, obtaining corrected image data shown in FIG. 17B. Each hatched pixel in the corrected image data is a pixel in which the correction value "17" is added to a pixel having a pixel value "0" after AM screen processing. In this example, the pixel value "17" is equal to the minimum quantization representative value.

Stable dot formation is difficult for data of such a small value. For this reason, the stabilization pixel detection unit 23 compares the pixel value of corrected image data with a predetermined threshold, and when the pixel value of corrected image data is smaller than the threshold, controls the dot stabilization unit 19 not to perform dot stabilization processing.

The dot stabilization unit 19 performs the same dot stabilization as that in each of the above-described embodiments, but is different from the above-described embodiments in that dot stabilization processing is ON/OFF-controlled under the control of the stabilization pixel detection unit 23.

For example, when a pixel having a very small value is generated near a white pixel boundary, a dot corresponding to the pixel having such a small value hardly contributes to correction of density fluctuations. Especially, it is difficult to visually detect density fluctuations in boundary pixels. Thus, the image quality is stabilized when a dot corresponding to a pixel of a small value generated by correction is not reproduced. For example, when the threshold of the stabilization pixel detection unit 23 is set to be "34", it can be controlled not to perform dot stabilization processing on pixels in the hatched portion of FIG. 17B. That is, stabilization of an unstable dot hardly contributing to correction of density fluctuations is not performed. As a result, stabilization processing is less performed on image data of a flat portion other than boundary pixels. Since the flat portion has undergone AM screen processing, dots can be formed stably without performing dot stabilization processing. The sixth embodiment can simplify dot stabilization processing by applying dot stabilization processing to only specific pixels.

Seventh Embodiment

Image processing according to the seventh embodiment of the present invention will be described. In the seventh embodiment, the same reference numerals as those in the first to sixth embodiments denote the same parts, and a detailed description thereof will not be repeated.

Figure 18:
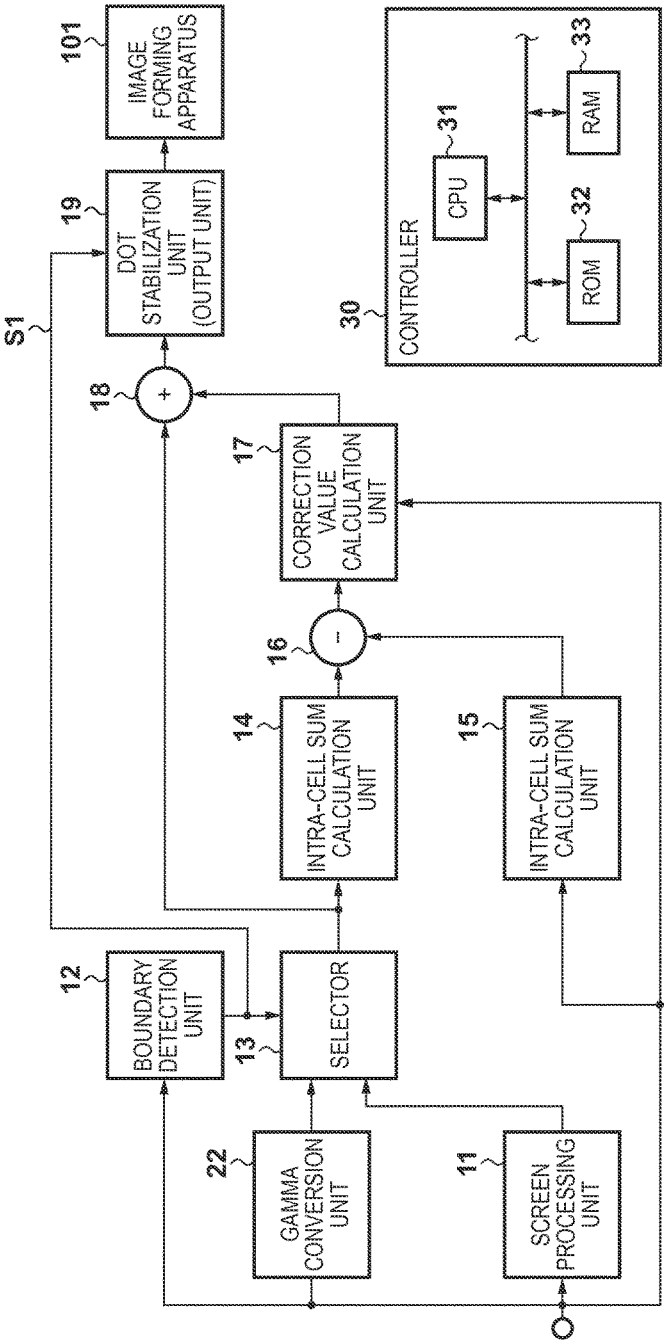
FIG. 18 is a block diagram showing the arrangement of an image processing apparatus which performs halftone processing according to the seventh embodiment.

FIG. 18 is a block diagram showing the arrangement of an image processing apparatus according to the seventh embodiment. A dot stabilization unit 19 in the seventh embodiment receives the detection result of a boundary detection unit 12 via a signal line S1. That is, dot stabilization processing by the dot stabilization unit 19 is controlled by the detection result of the boundary detection unit 12.

The dot stabilization unit 19 performs dot stabilization processing on a pixel of corrected image data that corresponds to the pixel position of a detected boundary pixel, and does not perform it for a pixel of corrected image data that corresponds to the pixel position of a non boundary pixel. As a result, it becomes possible to reliably perform dot stabilization processing on a boundary pixel, and not to perform stabilization of an unstable dot hardly contributing to correction of density fluctuations.

As described above, when dot stabilization processing is necessary, a dot is mainly assumed to form a fine line or isolated point. By gamma-converting boundary pixels, a fine line or isolated point is linearly connected. However, when the density of a boundary pixel is very low, the density of the boundary pixel after gamma conversion may become a density at which a dot cannot be formed stably. To prevent this, dot stabilization processing is performed on a pixel of corrected image data that corresponds to the pixel position of a boundary pixel. To the contrary, a pixel of corrected image data that corresponds to the pixel position of a non boundary pixel is considered to be a pixel of a flat portion, and has undergone AM screen processing. Thus, a dot can be formed stably without performing dot stabilization processing. The seventh embodiment can simplify dot stabilization processing by applying dot stabilization processing to only specific pixels.

Modification of Embodiments

In the fifth to seventh embodiments, image data after gamma conversion can be converted in accordance with the precision of a PWM circuit in the image forming apparatus 101.

When a signal for identifying a boundary pixel is input as attribute data of an input pixel together with input pixel data, the boundary pixel can be detected using the attribute data. In this case, the boundary detection unit 12 can be omitted. That is, when position information representing the position of a boundary pixel in input image data is input, the position of the boundary pixel can be specified using the position information.

Other Embodiment

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2013-129028 filed Jun. 19, 2013 and No. 2013-242889 filed Nov. 25, 2013 which are hereby incorporated by reference herein in their entirety.

What is claimed is:

1. An image processing apparatus comprising:
a processor; and
a memory coupled to the processor, the memory having instructions stored thereon which, when executed by the processor, cause the image processing apparatus to:
perform screen processing on input image data;
detect a boundary pixel by determining whether or not a pixel of interest is a boundary pixel in the input image data, wherein the pixel of interest is detected as a boundary pixel when the pixel of interest is not a white pixel and adjacent to a white pixel;
selectively output image data based on a result of the detection,
wherein, in a case where the pixel of interest is determined as the boundary pixel, a value of the pixel of interest of the input image data on which the screen processing has not been performed is outputted as an output value of the pixel of interest, and
wherein, in a case where the pixel of interest is determined not to be the boundary pixel, a value of the pixel of interest of the image data obtained by performing the screen processing is outputted as an output value of the pixel of interest;
calculate a sum value of the input image data as a first sum value for each cell in the screen processing;
calculate, as a second sum value for each cell in the screen processing, a sum value of image data output;
calculate a correction value based on a difference between the first sum value and the second sum value, and a number of effective pixels in the cell; and
correct the output image data based on the correction value.

2. The apparatus according to claim 1, wherein the value of the pixel of interest of the input image data on which the screen processing has not been performed is a value obtained as a result of performing tone correction on a pixel value of the pixel of interest in the input image data.

3. The apparatus according to claim 1, wherein the value of the pixel of interest of the input image data on which the screen processing has not been performed is a pixel value of the pixel of interest in the input image data.

4. The apparatus according to claim 1, wherein the input image data and the output image data are image data having a same number of tones.

5. The apparatus according to claim 1, wherein the memory storing instructions, when executed by the processor, further causes the image processing apparatus to detect a white fine line in the input image data,
   wherein a pixel adjacent to the white fine line is not detected as a boundary pixel.

6. The apparatus according to claim 5, wherein a pixel adjacent to a black pixel and the white fine line is detected as a boundary pixel.

7. The apparatus according to claim 1, wherein, in a case where the correction value is smaller than a predetermined threshold, the memory storing instructions, when executed by the processor, further causes the image processing apparatus to set the correction value to be 0.

8. The apparatus according to claim 1, wherein the memory storing instructions, when executed by the processor, further causes the image processing apparatus to output the corrected image data to an image forming apparatus.

9. The apparatus according to claim 8, wherein the memory storing instructions, when executed by the processor, further causes the image processing apparatus to perform tone conversion to convert a number of tones of the corrected image data into a number of tones of the image forming apparatus.

10. The apparatus according to claim 8, wherein the memory storing instructions, when executed by the processor, further causes the image processing apparatus to perform dot stabilization processing to correct image data with which dots are unstably formed in image formation by the image forming apparatus, into image data with which dots are stably formed.

11. The apparatus according to claim 10, wherein the memory storing instructions, when executed by the processor, further causes the image processing apparatus to the control the dot stabilization processing based on the detection result.

12. The apparatus according to claim 11, wherein in a case where the detection result represents either a boundary pixel or an edge pixel, the memory storing instructions, when executed by the processor, further causes the image processing apparatus to execute the dot stabilization processing, and in another case where the detection result represents another pixel, the image processing apparatus does not execute the dot stabilization processing.

13. The apparatus according to claim 1, wherein the screen processing includes performing AM screen processing.

14. The apparatus according to claim 1, wherein the screen processing is performed using an ordered dither method.

15. A method of an image processing apparatus, the method comprising:
   performing screen processing on input image data;
   detecting a boundary pixel in the input image data by determining whether or not a pixel of interest is a boundary pixel in the input image data, wherein the pixel of interest is detected as a boundary pixel when the pixel of interest is not a white pixel and adjacent to a white pixel;
   selectively outputting output image data based on a result of the detection,
   wherein, in a case where the pixel of interest is determined as the boundary pixel in the detecting, a value of the pixel of interest of the input image data, on which the screen processing has not been performed is outputted as an output value of the pixel of interest, and
   wherein, in a case where the pixel of interest is determined not to be a boundary pixel in the detecting, a value of the pixel of interest of the image data obtained by performing the screen processing is outputted as an output value of the pixel of interest in the outputting;
   calculating a sum value of the input image data as a first sum value for each cell in the screen processing;
   calculating, as a second sum value for each cell in the screen processing, a sum value of output image data;
   calculating a correction value based on a difference between the first sum value and the second sum value, and a number of effective pixels in the cell; and
   correcting the output image data based on the correction value.

16. A non-transitory computer readable medium storing a computer-executable program for causing a computer to perform an image processing method, the method comprising:
   performing screen processing on input image data;
   detecting a boundary pixel in the input image data by determining whether or not a pixel of interest is a boundary pixel in the input image data, wherein the pixel of interest is detected as a boundary pixel when the pixel of interest is not a white pixel and adjacent to a white pixel;
   selectively outputting output image data based on a result of the detection,
   wherein, in a case where the pixel of interest is determined as the boundary pixel in the detecting, a value of the pixel of interest of the input image data, on which the screen processing has not been performed is outputted as an output value of the pixel of interest, and
   wherein, in a case where the pixel of interest is determined not to be boundary pixel in the detecting, a value of the pixel of interest of the image data obtained by performing the screen processing is outputted as an output value of the pixel of interest in the outputting;
   calculating a sum value of the input image data as a first sum value for each cell in the screen processing;
   calculating, as a second sum value for each cell in the screen processing, a sum value of output image data;
   calculating a correction value based on a difference between the first sum value and the second sum value, and a number of effective pixels in the cell; and
   correcting the output image data based on the correction value.

17. The apparatus according to claim 1, wherein the value in the image data obtained by performing the screen processing on the input image data is a value based on a pixel value of the pixel of interest in the input image data.

* * * * *